(12) United States Patent  
Ikesue et al.

(10) Patent No.: US 9,952,491 B2
(45) Date of Patent: Apr. 24, 2018

(54) PHOSPHOR, WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Akio Ikesue, Nagoya (JP); Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/363,709

(22) Filed: Nov. 29, 2016

(65) Prior Publication Data
US 2017/0160627 A1 Jun. 8, 2017

(30) Foreign Application Priority Data

Dec. 3, 2015 (JP) ................. 2015-236319
Dec. 9, 2015 (JP) ................. 2015-239956
Dec. 9, 2015 (JP) ................. 2015-239957
Sep. 23, 2016 (JP) ................. 2016-185193
Oct. 4, 2016 (JP) ................. 2016-196203

(51) Int. Cl.
*G03B 21/20* (2006.01)
*H04N 9/31* (2006.01)
(Continued)

(52) U.S. Cl.
CPC ............ *G03B 21/204* (2013.01); *C04B 35/10* (2013.01); *C04B 35/44* (2013.01); *C09K 11/7774* (2013.01); *G03B 21/005* (2013.01); *G03B 21/16* (2013.01); *H04N 9/3105* (2013.01); *H04N 9/3158* (2013.01); *H04N 9/3161* (2013.01); *C04B 2235/3222* (2013.01); *C04B 2235/3225* (2013.01); *C04B 2235/3229* (2013.01);
(Continued)

(58) Field of Classification Search
CPC .... G03B 21/204; H04N 9/3158; C04B 35/10; C04B 2235/3222; C04B 2235/3225; C04B 2235/3229; C04B 2235/85; C09K 11/7774
USPC ............................................................ 362/84
See application file for complete search history.

(56) References Cited

U.S. PATENT DOCUMENTS 9,052,582 B2 * 6/2015 Komatsu ............. G03B 21/204
2008/0318761 A1 12/2008 Riedel et al.
(Continued)

FOREIGN PATENT DOCUMENTS

JP 2004-146835 A 5/2004
JP 2006-041096 A 2/2006
(Continued)

OTHER PUBLICATIONS

Fujioka, Kana. "Study on Ceramic Laser Matericals and Nonlinear Optical Crystals for High Intensity Laser". Jan. 2011.
(Continued)

*Primary Examiner* — Ryan Howard
(74) *Attorney, Agent, or Firm* — Oliff PLC

(57) ABSTRACT

A phosphor includes a sintered body of a ceramic material. The sintered body contains $Ce:Y_3Al_5O_{12}$ as a main phase and a ceramic material as a subphase. The ceramic material has a refractive index different from that of the main phase. The sintered body has a crystal grain boundary and a void at the crystal grain boundary.

20 Claims, 16 Drawing Sheets

(51) Int. Cl.
  *C04B 35/10* (2006.01)
  *G03B 21/00* (2006.01)
  *G03B 21/16* (2006.01)
  *C09K 11/77* (2006.01)
  *C04B 35/44* (2006.01)

(52) U.S. Cl.
  CPC .... *C04B 2235/764* (2013.01); *C04B 2235/80* (2013.01); *C04B 2235/85* (2013.01); *C04B 2235/9646* (2013.01)

(56) References Cited

U.S. PATENT DOCUMENTS

| | | |
|---|---|---|
| 2009/0284148 A1 | 11/2009 | Iwanaga |
| 2011/0272725 A1 | 11/2011 | Wataya et al. |
| 2012/0177909 A1* | 7/2012 | Uchino .................. C04B 35/10 428/312.6 |
| 2016/0077415 A1* | 3/2016 | Motoya ................ G03B 21/204 353/84 |

FOREIGN PATENT DOCUMENTS

| | | |
|---|---|---|
| JP | 2008-529758 A | 8/2008 |
| JP | 2009-277516 A | 11/2009 |
| JP | 2011-513898 A | 4/2011 |
| JP | 2011-256371 A | 12/2011 |
| JP | 2012-153904 A | 8/2012 |
| JP | 2013-518172 A | 5/2013 |
| JP | 2014-062072 A | 4/2014 |
| JP | 2016-138020 A | 8/2016 |
| JP | 2016-176007 A | 10/2016 |
| WO | 2009-105581 A1 | 8/2009 |
| WO | 2011-094404 A1 | 8/2011 |
| WO | 2017-002467 A1 | 1/2017 |

OTHER PUBLICATIONS

Ikesue, Akio. "Ce. YAG Ceramic Scintillator for Electron Beam Detector". Research and Development Laboratory, Japan Fine Ceramics Center, vol. 108 [11], pp. 1020, 2000.
Ceramics 9th Session Jun. 17 (Wednesday) Physical Properties of Ceramics.

* cited by examiner

PHOSPHOR, WAVELENGTH CONVERSION ELEMENT, LIGHT SOURCE DEVICE, AND PROJECTOR

BACKGROUND

1. Technical Field

The present invention relates to a phosphor, a wavelength conversion element, a light source device, and a projector.

2. Related Art

JP-A-2009-277516 (Patent Document 1) describes a light source device utilizing fluorescence emitted from a phosphor as illumination light. This phosphor includes a binder composed of an organic material and phosphor particles dispersed in the binder. However, the heat resistance of the organic material is lower than that of an inorganic material, and therefore, when the binder is irradiated with high-intensity laser light as excitation light, the binder is degraded by heat.

JP-T-2013-518172 (Patent Document 2) discloses an inorganic phosphor which does not contain an organic material. The inorganic phosphor is obtained by sintering a plurality of phosphor particles.

However, the phosphor disclosed in Patent Document 2 has a plurality of voids, and therefore, the thermal conductivity of the phosphor is lower than the thermal conductivity of the phosphor particles. Due to this, when the phosphor is irradiated with high-intensity laser light as excitation light, heat is accumulated therein, and the luminous efficiency of the phosphor particles is deteriorated. Further, the more voids are included in the phosphor, the more easily the phosphor is broken, and therefore, there is a possibility that the phosphor is broken by thermal stress. For example, when the phosphor is irradiated with high-intensity excitation light, large thermal stress is generated by an in-plane temperature difference. Further, when excitation light is converged and irradiated on a narrow region so as to use the phosphor as a point light source, the temperature of the phosphor becomes high at the excitation light irradiation position, and therefore, large thermal stress is generated.

In the case where the phosphor having a plurality of voids is processed into a phosphor layer having a given thickness by, for example, polishing, the exposure of the voids on the surface of the phosphor layer cannot be avoided. Due to this, there exist concave portions derived from the voids on the surface of the phosphor layer. In the light source device described in Patent Document 1, in order to improve the utilization efficiency of light, an optical functional layer such as a dielectric multilayer film is sometimes provided on the surface of the phosphor layer. However, in the case where an optical functional layer is formed on the phosphor layer disclosed in Patent Document 2 having concave portions on the surface, it is difficult to form the optical functional layer in an intended state in the concave portions, and it is difficult to form the optical functional layer having intended properties.

On the other hand, the voids have a function to scatter fluorescence generated inside the phosphor. The light scattering function inside the phosphor is needed for increasing the extraction efficiency of fluorescence generated inside the phosphor and efficiently utilizing the fluorescence. When the voids are reduced, the scattering source in the phosphor is reduced, and therefore, not only the utilization efficiency of fluorescence is decreased, but also the fluorescence emission region is expanded, and the utilization efficiency of fluorescence by an optical system in the latter part is decreased.

Further, the improvement of the quantum yield of the phosphor has been demanded.

SUMMARY

An advantage of some aspects of the invention is to provide a phosphor in which at least one of the above problems has been solved. Further, another advantage of some aspects of the invention is to provide a wavelength conversion element, a light source device, and a projector, each including the phosphor as described above.

A first aspect of the invention provides a phosphor including a sintered body of a ceramic material. The sintered body contains $Ce:Y_3Al_5O_{12}$ as a main phase and a ceramic material as a subphase. The ceramic material has a refractive index different from that of the main phase. The sintered body further includes a crystal grain boundary and a void at the crystal grain boundary.

In the phosphor according to the first aspect of the invention, the subphase favorably functions as a light scattering source. Specifically, a boundary between the main phase and the subphase functions as a light scattering source. Therefore, in the sintered body according to the first aspect of the invention, the void amount can be reduced as compared with a sintered body which does not contain the subphase. That is, the thermal conductivity can be increased. Accordingly, balance between thermal conductivity and light scattering property can be achieved.

In the phosphor according to the first aspect of the invention, the subphase may contain $Ce:YAlO_3$, $CeO_2$, $Y_2O_3$, or $Ce:Y_2O_3$ as a first crystal grain.

According to this configuration, the quantum yield of the phosphor is higher than in the case where a phosphor does not contain the subphase. Further, the subphase favorably functions as a scattering source.

In the phosphor according to the first aspect of the invention, the subphase may further include a second crystal grain different from the first crystal grain, and may contain $Ce:YAlO_3$, $CeO_2$, $Y_2O_3$, or $Ce:Y_2O_3$ as the second crystal grain.

According to this configuration, the subphase favorably functions as a scattering source.

In the phosphor according to the first aspect of the invention, the subphase may contain $Ce:YAlO_3$, $CeO_2$, or $Ce:Y_2O_3$, and the atomic concentration [Y] (at %) of yttrium in the sintered body may satisfy the following conditions (i) and (ii): (i) $0.6<[Y]/[Al]$; and (ii) $0.6<[Re]/[Al]\leq 0.652$.

In the above conditions, [Re] represents the sum of the atomic concentration of yttrium and the atomic concentration of cerium, and [Al] represents the atomic concentration of aluminum.

According to this configuration, the subphase can be reliably formed in the sintered body. Further, the phosphor can be sufficiently densified, and the void amount can be reduced, and therefore, an excellent balance between the amount of the main phase which emits fluorescence and the amount of the subphase which functions as a scattering source can be achieved, and thus, a high quality phosphor can be provided.

In the phosphor according to the first aspect of the invention, the main phase may surround the periphery of the subphase.

According to this configuration, the main phase and the subphase are present as different crystal grains, and can favorably exhibit their respective functions.

In the phosphor according to the first aspect of the invention, the void may have a scale-like shape.

When the void has a scale-like shape, the surface area of the void is larger than that of a void having a spherical shape and the same volume, and therefore, light traveling inside the phosphor easily hits the void, and therefore is more easily scattered.

In the phosphor according to the first aspect of the invention, a crystal grain constituting the main phase and a crystal grain constituting the subphase may have a granular shape.

According to this configuration, the phosphor is easily produced.

In the phosphor according to the first aspect of the invention, the ratio of the volume of the main phase to the total volume of the main phase and the subphase may be 90 vol % or more and less than 100 vol %.

According to this configuration, an excellent balance between the amount of the main phase which emits fluorescence and the amount of the subphase which functions as a scattering source can be achieved, and thus, a high quality phosphor can be provided.

A second aspect of the invention provides a wavelength conversion element including a phosphor layer containing the phosphor according to the aspect of the invention as a constituent material.

According to this configuration, the wavelength conversion element includes the phosphor according to the aspect of the invention, and therefore is hardly damaged by heat and also has a desired light scattering property.

A third aspect of the invention provides a light source device including the wavelength conversion element according to the aspect of the invention, and a light source which irradiates the phosphor layer included in the wavelength conversion element with excitation light.

According to this configuration, the light source device includes the phosphor according to the aspect of the invention, and therefore is hardly damaged by heat.

A fourth aspect of the invention provides a projector including the light source device according to the aspect of the invention, a light modulator which modulates light from the light source device in accordance with image information to form image light, and a projection optical system which projects the image light.

According to this configuration, the projector includes the phosphor according to the aspect of the invention, and therefore is hardly damaged by heat.

A fifth aspect of the invention provides a wavelength conversion element including a phosphor layer and an optical functional layer provided on the surface of the phosphor layer. The phosphor layer is composed of a sintered body containing a fluorescent ceramic material as a first crystallite and a ceramic material as a second crystallite. The ceramic material has a refractive index different from that of the first crystallite, and the sintered body has a crystal grain boundary and a void at the crystal grain boundary.

In the wavelength conversion element according to the fifth aspect of the invention, the second crystallite favorably functions as a scattering source. Specifically, a boundary between the first crystallite and the second crystallite functions as a light scattering source. Therefore, in the sintered body according to the fifth aspect of the invention, the void amount can be reduced as compared with a sintered body which does not contain the second crystallite. That is, the amount of concave portions formed by exposing the voids on the surface of the phosphor layer can be reduced. Therefore, a defect hardly occurs in the optical functional layer formed on the surface of the phosphor layer.

In the phosphor according to the fifth aspect of the invention, the first crystallite may contain $Ce:Y_3Al_5O_{12}$, and the second crystallite may contain $Ce:YAlO_3$, $CeO_2$, $Y_2O_3$, $Ce:Y_2O_3$, or $YAlO_3$.

According to this configuration, the quantum yield of the phosphor is higher than in the case where a phosphor does not contain the second crystallite. Further, the second crystallite favorably functions as a scattering source.

In the wavelength conversion element according to the fifth aspect of the invention, the optical functional layer may be an antireflective film.

According to this configuration, a wavelength conversion element including an antireflective film which has a few defects and has a high antireflective function on the surface thereof can be provided.

In the wavelength conversion element according to the fifth aspect of the invention, the optical functional layer may be a dichroic film.

According to this configuration, a wavelength conversion element including a dichroic film which has a few defects and has a high wavelength selection function on the surface thereof can be provided. Therefore, fluorescence generated in the phosphor layer is emitted in a desired direction.

In the wavelength conversion element according to the fifth aspect of the invention, the optical functional layer may be a reflective film.

According to this configuration, a wavelength conversion element including a reflective film which has a few defects and has a high reflective function on the surface thereof can be provided. Therefore, fluorescence generated in the phosphor layer is emitted in a desired direction.

In the wavelength conversion element according to the fifth aspect of the invention, the phosphor layer may further contain a ceramic material different from the second crystallite as a third crystallite, and the refractive index of the third crystallite may be different from the refractive index of the first crystallite.

According to this configuration, also the third crystallite favorably functions as a scattering source.

A sixth aspect of the invention provides a light source device including the wavelength conversion element according to the aspect of the invention, and a light source which irradiates the phosphor layer included in the wavelength conversion element with excitation light.

The light source device having such a configuration includes the wavelength conversion element according to the aspect of the invention, and therefore can emit high-luminance light.

A seventh aspect of the invention provides a projector including the light source device according to the aspect of the invention, a light modulator which modulates light from the light source device in accordance with image information to form image light, and a projection optical system which projects the image light.

The projector having such a configuration includes the light source device according to the aspect of the invention, and therefore can project a high-luminance image.

An eighth aspect of the invention provides a light source device including a light source which emits excitation light, a wavelength conversion element including a phosphor layer that emits fluorescence in response to excitation by the excitation light, and a condenser optical system which is disposed on the optical path of the excitation light between the light source and the wavelength conversion element, and condenses the excitation light on the phosphor layer, wherein the phosphor layer is composed of a sintered body containing a fluorescent ceramic material as a first crystallite and a ceramic material as a second crystallite, the ceramic material having a refractive index different from a refractive index of the first crystallite.

In the light source device according to the eighth aspect of the invention, the second crystallite favorably functions as a scattering source. Specifically, a boundary between the first crystallite and the second crystallite functions as a light scattering source. Therefore, in the sintered body according to the eighth aspect of the invention, the void amount can be reduced as compared with a sintered body which does not contain the second crystallite. That is, the thermal conductivity can be increased. Accordingly, the increase in the temperature of the phosphor layer is reduced, and thus, the phosphor layer is hardly broken.

In the light source device according to the eighth aspect of the invention, the first crystallite may contain $Ce:Y_3Al_5O_{12}$, and the second crystallite may contain $YAlO_3$.

In the sintered body containing $YAlO_3$ (hereinafter referred to as "YAP"), the crystallite sizes of the first crystallite and the second crystallite tend to be small when producing the sintered body as compared with the case where a sintered body does not contain YAP. When the crystallite sizes of the crystallites constituting the sintered body are small, the bending strength of the sintered body is high. Due to this, according to such a configuration, breakage due to thermal stress hardly occurs.

A ninth aspect of the invention provides a projector including the light source device according to the aspect of the invention, a light modulator which modulates light from the light source device in accordance with image information to form image light, and a projection optical system which projects the image light.

The projector having such a configuration includes the light source device according to the aspect of the invention, and therefore has high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a phosphor, a wavelength conversion element, a light source device, and a projector according to this embodiment will be described with reference to the drawings. In all the drawings described below, in order to make the drawings easy to see, the dimensions, ratios, and the like of the respective constituent elements are appropriately made different from the actual ones.

Figure 1:
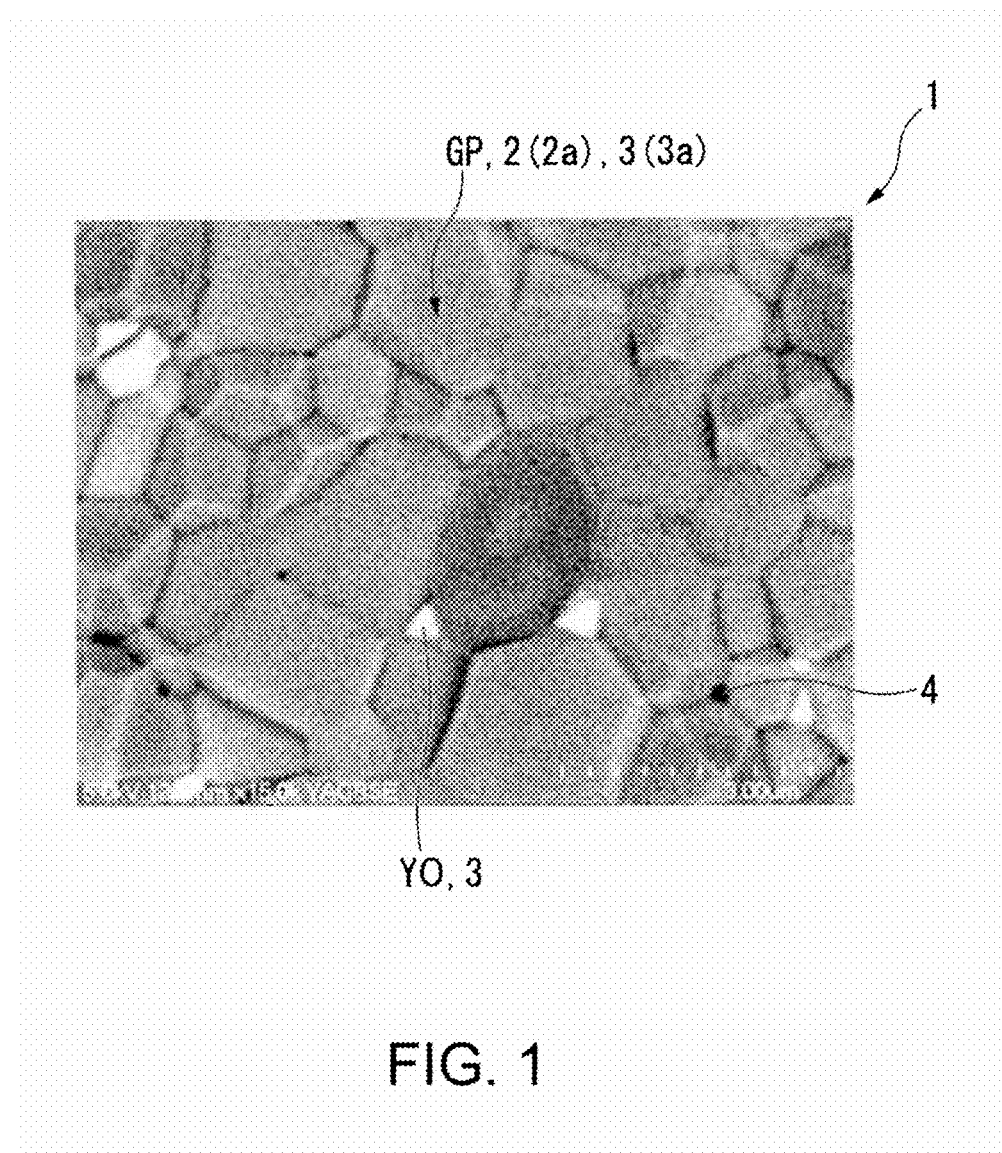
FIG. 1 is an SEM image showing one example of a phosphor of a first embodiment.

FIG. 1 is an SEM image showing one example of a phosphor of this embodiment and is a backscattering electron image (BSE image). A phosphor 1 of this embodiment is composed of a sintered body of a ceramic material.

The phosphor 1 contains $Ce:Y_3Al_5O_{12}$ (hereinafter referred to as "Ce:YAG") as a main phase 2 and two types of ceramic materials as a subphase 3. The two types of ceramic materials are $Ce:YAlO_3$, (hereinafter referred to as "Ce:YAP") and $Ce:Y_2O_3$. Further, the phosphor 1 contains a plurality of voids 4.

In FIG. 1, a crystal grain composed of $Ce:Y_2O_3$ is represented by a symbol "YO". In a BSE image, it is not easy to distinguish between Ce:YAG and Ce:YAP, and therefore, in FIG. 1, a crystal grain composed of Ce:YAG and a crystal grain composed of Ce:YAP are each represented by a symbol "GP". The phosphor 1 has a crystal grain boundary and also has the void 4 at the crystal grain boundary.

Ce:YAP corresponds to the first crystal grain described in the appended claims, and Ce:$Y_2O_3$ corresponds to the second crystal grain described in the appended claims. The constituent material of the second crystal grain is different from the constituent material of the first crystal grain. Hereinafter, in the specification, the crystal grain constituting the main phase 2 is referred to as "crystal grain 2a", and the crystal grain constituting the subphase 3 is referred to as "crystal grain 3a".

Ce:YAG is a yellow phosphor which emits yellow fluorescence by being irradiated with excitation light. The main phase 2 is formed by sintering a plurality of crystal grains 2a composed of Ce:YAG.

The subphase 3 is composed of a constituent material different from that of the main phase 2. In this embodiment, as the constituent material of the subphase 3, Ce:YAP and Ce:$Y_2O_3$ are used, however, it is not limited thereto. The constituent material may be, for example, $Al_2O_3$, $CeO_2$, $Y_2O_3$, or YAP. As described below, $Al_2O_3$, $CeO_2$, and $Y_2O_3$ are starting materials to be used in the synthesis of Ce:YAG. The subphase 3 may be composed of one type of constituent material or may be composed of a plurality of constituent materials as in this embodiment. At least one of the main phase 2, the first crystal grain, and the second crystal grain may contain metal impurities contained in the starting material or the like.

The refractive indices of the above-mentioned respective materials are as follows: Ce:YAG (1.83), $Al_2O_3$ (1.76), Ce:YAP (1.93), $CeO_2$ (2.2), $Y_2O_3$ (1.87), Ce:$Y_2O_3$ (1.87 to 2.2), and YAP (1.93). The refractive index of Ce:$Y_2O_3$ varies depending on the content of Ce. The refractive index of Ce:YAP and the refractive index of Ce:$Y_2O_3$ are different from the refractive index of the main phase 2 (Ce:YAG), and therefore the subphase 3 favorably functions as a scattering source.

The thermal conductivity of these materials constituting the subphase 3 is comparable to that of Ce:YAG, and therefore, even if the phosphor 1 contains the subphase 3, the thermal conductivity of the phosphor 1 does not greatly decrease.

It is preferred that the crystal grain 2a and the crystal grain 3a have a granular shape. If such a configuration is adopted, the phosphor is easily produced. Here, in this embodiment, the "granular shape" refers to a shape in which when the shape of a crystal grain in an SEM image is approximated to a rectangle, the ratio of the short side to the long side is 0.3 or more. The average crystal grain size of the crystal grain 2a is preferably 0.8 μm or more and 1.2 μm or less.

With respect to the crystal grain 3a, in the case where the thickness of the phosphor 1 is 200 μm, the average crystal grain size thereof may be 0.5 μm or more and 20 μm or less. In the case where the crystal grain 3a is composed of Ce:YAP, the average crystal grain size of the crystal grain 3a is preferably 0.8 μm or more and 1.2 μm or less. Further, in the case where the crystal grain 3a is composed of $CeO_2$ or Ce:$Y_2O_3$, the average crystal grain size of the crystal grain 3a is preferably 0.33 μm or more and 0.5 μm or less.

Further, the crystal grain 2a may have a film shape. In the case where the shape of the crystal grain 2a is a film shape, the surface area of the crystal grain 2a is increased, and as described below, the crystal grain 2a easily scatters light, and therefore, such a shape is preferred. For the same reason, the crystal grain 3a may have a film shape.

Here, in this embodiment, the average crystal grain size of the crystal grains 2a or 3a is determined as follows.

First, the phosphor 1 is fractured, and a BSE image of the fractured surface is taken by SEM. At this time, the image is taken at a magnification such that approximately about 50 crystal grains are included in one field of view.

Subsequently, based on the obtained SEM image, image processing is performed such that the respective crystal grains are distinguished along the crystal grain boundary.

Subsequently, the area of each crystal grain is determined from the SEM image after image processing, and a circle equivalent diameter which is a diameter of a circle having the same area as the area determined for each crystal grain is calculated. The obtained circle equivalent diameters are arithmetically averaged, whereby an average crystal grain size is determined.

The void 4 preferably has a scale-like shape. Here, in this embodiment, the "scale-like shape" refers to a shape in which when the shape of a void in an SEM image is approximated to a rectangle, the ratio of the short side to the long side is less than 0.3. However, the ratio of the short side to the long side of the void 4 may be 0.3 or more.

As described below, the void 4 has a function to scatter light traveling inside the phosphor 1 by reflecting or refracting the light. Therefore, when the void 4 has a scale-like shape, the surface area of the void 4 is larger than that of a void having a spherical shape and the same volume, and therefore, light traveling inside the phosphor 1 easily hits the void 4, and therefore is more easily scattered. Incidentally, the "light traveling inside the phosphor 1" includes both excitation light having entered the phosphor 1 and fluorescence generated by the phosphor 1.

When the phosphor 1 contains the void 4, the thermal conductivity is low as compared with the case where the phosphor 1 does not have the void 4. On the other hand, the void 4 has a function to scatter light traveling inside the phosphor 1. Therefore, the void amount ρ may be set in accordance with the physical properties required for the phosphor 1, that is, in accordance with the thermal conductivity and light scattering property. The void amount ρ will be described later.

In order to decrease the effect of accumulation of heat in the phosphor 1, thermal conductivity is preferably 9 W/m·k or more at 25° C. In order to achieve such thermal conductivity, the void amount ρ is preferably 0.01% or more and less than 5%.

In the phosphor 1, the volume of the main phase 2 is larger than the volume of the subphase 3. As shown in FIG. 1, the main phase 2 surrounds the periphery of the subphase 3. That is, the subphase 3 is present at the crystal grain boundary of the main phase 2. The main phase 2 and the subphase 3 are present as mutually different crystal grains, and can favorably exhibit their respective functions.

By using X-ray diffractometry, the respective proportions of Ce:YAG, Ce:YAP, and Ce:$Y_2O_3$ contained in the phosphor 1 were measured. As a result, the proportions of Ce:YAG, Ce:YAP, and Ce:$Y_2O_3$ were 91.8 vol %, 5.7 vol %, and 2.5 volt, respectively.

In the phosphor 1, the ratio of the volume of the main phase 2 to the total volume of the main phase 2 and the subphase 3 is preferably 90 volt or more and less than 100 vol %. When the volume ratio falls within such a range, an excellent balance between the amount of the main phase 2 which emits fluorescence and the amount of the subphase 3 which functions as a scattering source can be achieved, and thus, a high quality phosphor can be formed.

Further, in the sintered body constituting the phosphor 1, it is preferred that the atomic concentration (at %) of yttrium in the sintered body satisfies the following conditions (i) and (ii). In the following conditions (i) and (ii), [Y] represents the atomic concentration of yttrium, [Re] represents the sum of the atomic concentration of yttrium and the atomic concentration of cerium, and [Al] represents the atomic concentration of aluminum. As the respective atomic concentrations, a concentration with respect to the total amount of the metal atoms in the sintered body is shown.

$$0.6 < [Y]/[Al] \quad (i)$$

$$0.6 < [Re]/[Al] \leq 0.652 \quad (ii)$$

The value of [Y]/[Al] calculated from the stoichiometry of YAG ($Y_3Al_5O_{12}$), which is the host crystal of Ce:YAG, is 0.6. Therefore, the condition (i) shows that the phosphor 1 contains yttrium atoms excessively in an amount more than the amount calculated from the stoichiometry. The excess yttrium atoms contained in an amount more than the amount calculated from the stoichiometry constitute the subphase 3. That is, by satisfying the condition (i), the subphase 3 can be reliably formed in the phosphor 1.

The lower limit for the condition (ii) will be described. When the value of [Re]/[Al] is 0.6 or less, $Al_2O_3$ is basically generated as the subphase. A detailed description will be made later, however, the quantum yield of a phosphor which contains $Al_2O_3$ as the subphase is lower than the quantum yield of a phosphor which does not contain the subphase. Therefore, the value of [Re]/[Al] is preferably larger than 0.6.

A detailed description of the upper limit for the condition (ii) will be made later, however, by setting [Re]/[Al]≤0.652, the sintering temperature for the sintered body can be set so as not to exceed the upper temperature limit of a common sintering furnace. Due to this, the phosphor to be obtained can be sufficiently densified, and the void amount can be reduced, and therefore, an excellent balance between the amount of the main phase which emits fluorescence and the amount of the subphase which functions as a scattering source can be achieved, and thus, a high quality phosphor can be provided.

The "void amount" as used herein refers to the ratio of the total volume of a plurality of voids to the volume of the phosphor. The void amount $\rho$ can be determined as follows.

The volume of the phosphor is represented by $V_0$ and the total volume of a plurality of voids contained in the phosphor is represented by $V_2$. The void amount $\rho$ is given by the formula (1).

$$\rho = V_2/V_0 \quad (1)$$

Further, when the mass of the phosphor is represented by W, the density $\rho_1$ of the phosphor is given by the formula (2).

$$\rho_1 = W/V_0 \quad (2)$$

The volume $V_0$ of the phosphor and the mass W of the phosphor can be measured.

Here, by using X-ray diffractometry, the composition of the main phase, the composition of the subphase, and the volume ratio of the main phase to the subphase are determined. By using the results obtained by X-ray diffractometry, the theoretical density of the main phase, and the theoretical density of the subphase, the theoretical density $\rho_2$ of the phosphor itself is determined.

The theoretical density $\rho_2$ can be represented by the formula (3) using $V_0$, $V_2$, and W. Further, from the formula (3), the volume $V_2$ is represented by the following formula (4).

$$\rho_2 = W/(V_0 - V_2) \quad (3)$$

$$V_2 = V_0 - W/\rho_2 \quad (4)$$

From the above formula (1), (2), and (4), the void amount $\rho$ can be represented by the formula (5). That is, by using the actual measured density $\rho_1$ and the theoretical density $\rho_2$, the void amount $\rho$ can be obtained according to the formula (5).

$$\rho = 1 - \rho_1/\rho_2 \quad (5)$$

Figure 2A:
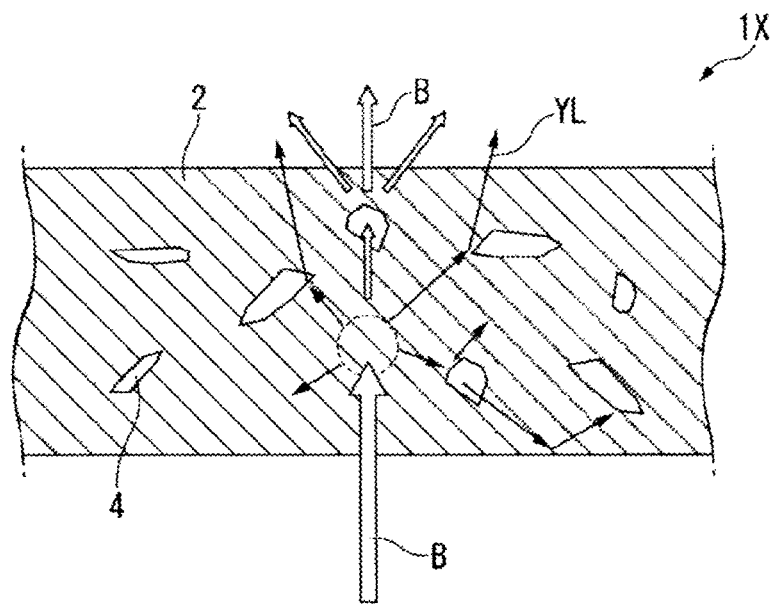
FIG. 2A is a schematic view showing a manner of emission when a phosphor in a related art is irradiated with excitation light.
Figure 2B:
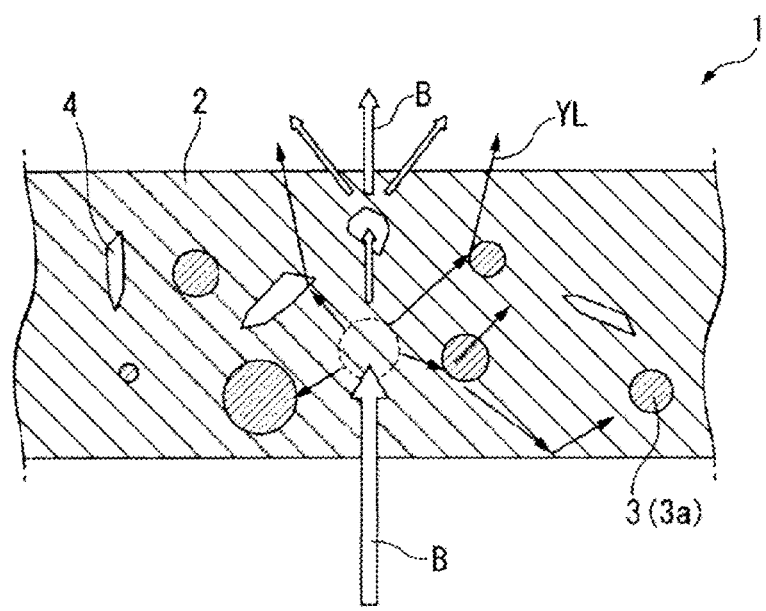
FIG. 2B is a schematic view showing a manner of emission when the phosphor of the first embodiment is irradiated with excitation light.

In the phosphor 1 having a configuration as described above, the following emission behavior is exhibited. FIG. 2A is a schematic view showing a manner of emission when a phosphor 1X in a related art, which does not contain the subphase 3, is irradiated with excitation light, and FIG. 2B is a schematic view showing a manner of emission when the phosphor 1 of this embodiment is irradiated with excitation light. The phosphor 1X and the phosphor 1 are each assumed to have Ce:YAG as the main phase 2.

When the phosphor 1X shown in FIG. 2A is irradiated with, for example, excitation light B which is blue laser light, the main phase 2 of the phosphor 1X absorbs part of the excitation light B, and yellow fluorescence YL is isotropically emitted. The fluorescence YL travels while changing the traveling direction (while scattering) by being refracted or reflected by the plurality of voids 4 present inside the phosphor 1X, and is emitted outside the phosphor 1X.

The remainder of the excitation light B which was not absorbed by the main phase 2 passes through the phosphor 1X. At this time, the remainder passes through the phosphor 1X while scattering by being refracted or reflected by the plurality of voids 4 in the same manner as the fluorescence YL. Due to this, from the phosphor 1X, white light in which the excitation light B and the fluorescence YL are mixed with each other is emitted.

However, in the phosphor 1X, a lot of voids 4 are formed for sufficiently scattering the excitation light B or the fluorescence YL, and therefore, the thermal conductivity of the phosphor 1X as a whole is lower than the thermal conductivity of Ce:YAG constituting the main phase 2. Therefore, when the phosphor 1X is irradiated with high-intensity laser light as the excitation light B, heat is accumulated therein, and the phosphor 1X may be damaged by the heat. For example, the luminous efficiency of the phosphor 1X is deteriorated.

On the other hand, the phosphor 1 shown in FIG. 2B contains the subphase 3 (a plurality of crystal grains 3a) having a refractive index different from that of the main phase 2. The subphase 3 can scatter the excitation light B or the fluorescence YL by refraction or reflection. Due to this, in the phosphor 1, the void amount $\rho$ can be reduced while making the ability to scatter the excitation light B or the fluorescence YL comparable to that of the phosphor 1X.

That is, the subphase 3 favorably functions as a scattering source, and therefore, the void amount $\rho$ can be reduced, and thus, the thermal conductivity can be increased as compared with the phosphor 1X. Due to this, the phosphor 1 which can balance thermal conductivity with optical properties can be provided.

ここから The present inventors prepared a phosphor A which does not contain the subphase 3, and a phosphor B and a phosphor C, each of which contains the subphase 3, and measured the quantum yield thereof. As the main phases 2 of the phosphor A, the phosphor B, and the phosphor C, Ce:YAG was used in all phosphors. As the subphase 3 of the phosphor B, Ce:YAP and Ce:$Y_2O_3$ were used, and as the subphase 3 of the phosphor C, $Al_2O_3$ was used. In the phosphor B, the value of [Re]/[Al] was set to 0.63, and the volume ratio of Ce:YAG:Ce:YAP:Ce:$Y_2O_3$ was set to 90:9:1. In the phosphor C, the value of [Re]/[Al] was set to 0.58, and the volume ratio of Ce:YAG:Al$_2$O$_3$ was set to 92:8. The quantum yield of the phosphor A was 91.7%, the quantum yield of the phosphor B was 94.2%, and the quantum yield of the phosphor C was 75.6%.

In this manner, it was found that Ce:YAP and Ce:Y$_2$O$_3$ improve the quantum yield. Further, it was found that also in the case where the phosphor contains only either one of Ce:YAP and Ce:Y$_2$O$_3$ as the subphase, the quantum yield is improved. In addition, it was found that also CeO$_2$ and Y$_2$O$_3$ improve the quantum yield. Therefore, it is preferred that the subphase 3 includes the crystal grain 3a containing Ce:YAP, Ce:Y$_2$O$_3$, CeO$_2$, or Y$_2$O$_3$.

Method for Producing Phosphor

The phosphor as described above can be produced as follows.

First, a raw material powder composed of a Y$_2$O$_3$ powder, an Al$_2$O$_3$ powder, and a CeO$_2$ powder was mixed with ethanol. While grinding the raw material powder using a ball mill, the obtained slurry is stirred.

At this time, a sintering aid containing an Si atom may be added to the raw material powder. As the sintering aid, SiO$_2$, CaO, and MgO can be exemplified. Further, during firing, a substance which exhibits the same effect as SiO$_2$, CaO, or MgO, for example, TEOS (tetraethyl orthosilicate) may be added as the sintering aid. The sintering aid is added such that, for example, the sintering aid remains after sintering at 100 ppm with respect to the mass of the raw material powder. Further, in the case where a substance which exhibits the same effect as SiO$_2$, CaO, or MgO during sintering, such as TEOS is added as the sintering aid, the substance is added such that, for example, when the sintering aid is converted to an equivalent substance after sintering, the equivalent substance remains after sintering at 100 ppm with respect to the mass of the raw material powder.

Subsequently, ethanol is removed from the obtained slurry, and the raw material powder is dried. The dried raw material powder is sieved to remove coarse grains. By doing this, a raw material powder composed of secondary grains having a grain size of several micrometers to several hundreds of micrometers including primary grains of Y$_2$O$_3$, Al$_2$O$_3$, and CeO$_2$ having a grain size of several tens of nanometers to several hundreds of nanometers is obtained. Thereafter, an appropriate amount of Y$_2$O$_3$ powder having a relatively large grain size of several micrometers to several tens of micrometers is additionally added thereto.

Subsequently, the raw material powder is compressed and molded into a desired shape, and then fired. In a firing step, aluminum does not reach up to the inside of a Y$_2$O$_3$ powder with a relatively large grain size, and therefore, the Y$_2$O$_3$ powder with a relatively large grain size is converted to a first crystal grain composed of Y$_2$O$_3$ or Ce:Y$_2$O$_3$ after firing.

Here, the upper limit of the condition (ii) will be described.

The upper temperature limit (usable temperature) of a common sintering furnace having a heating element of molybdenum disilicide is approximately about 1700° C. On the other hand, when the blending amount of the Y$_2$O$_3$ powder in the raw material powder is increased, the excess amount of Y$_2$O$_3$ behaves as an impurity in the sintered body, and the sintering temperature of the entire system tends to increase. Due to this, when [Re]/[Al] exceeds 0.652, theoretically, the sintering temperature of the sintered body exceeds the upper temperature limit of a common sintering furnace, and therefore, sufficient sintering cannot be performed. In such a case, in the obtained sintered body, the densification is insufficient, and the void amount ρ is increased, and therefore, a favorable phosphor cannot be obtained.

It is desirable that sintering is performed in an oxygen atmosphere in a common sintering furnace. Alternatively, sintering is performed in vacuum, in a neutral atmosphere such as nitrogen, or in a reducing atmosphere such as hydrogen, and thereafter, an annealing treatment may be performed in an oxygen atmosphere at, for example, 1000° C. or higher and 1400° C. or lower. The sintering temperature may be, for example, 1500° C. or higher and 1750° C. or lower. Further, a hot press sintering method or a hot isostatic pressing sintering method may be used.

On the other hand, in the case where the blending amount of the Y$_2$O$_3$ powder is increased within a range satisfying the condition (ii), the raw material powder can be favorably sintered, and a desired sintered body can be obtained.

As described above, the phosphor of this embodiment is obtained.

According to the phosphor having a configuration as described above, balance between thermal conductivity and light scattering property can be achieved.

Figure 3:
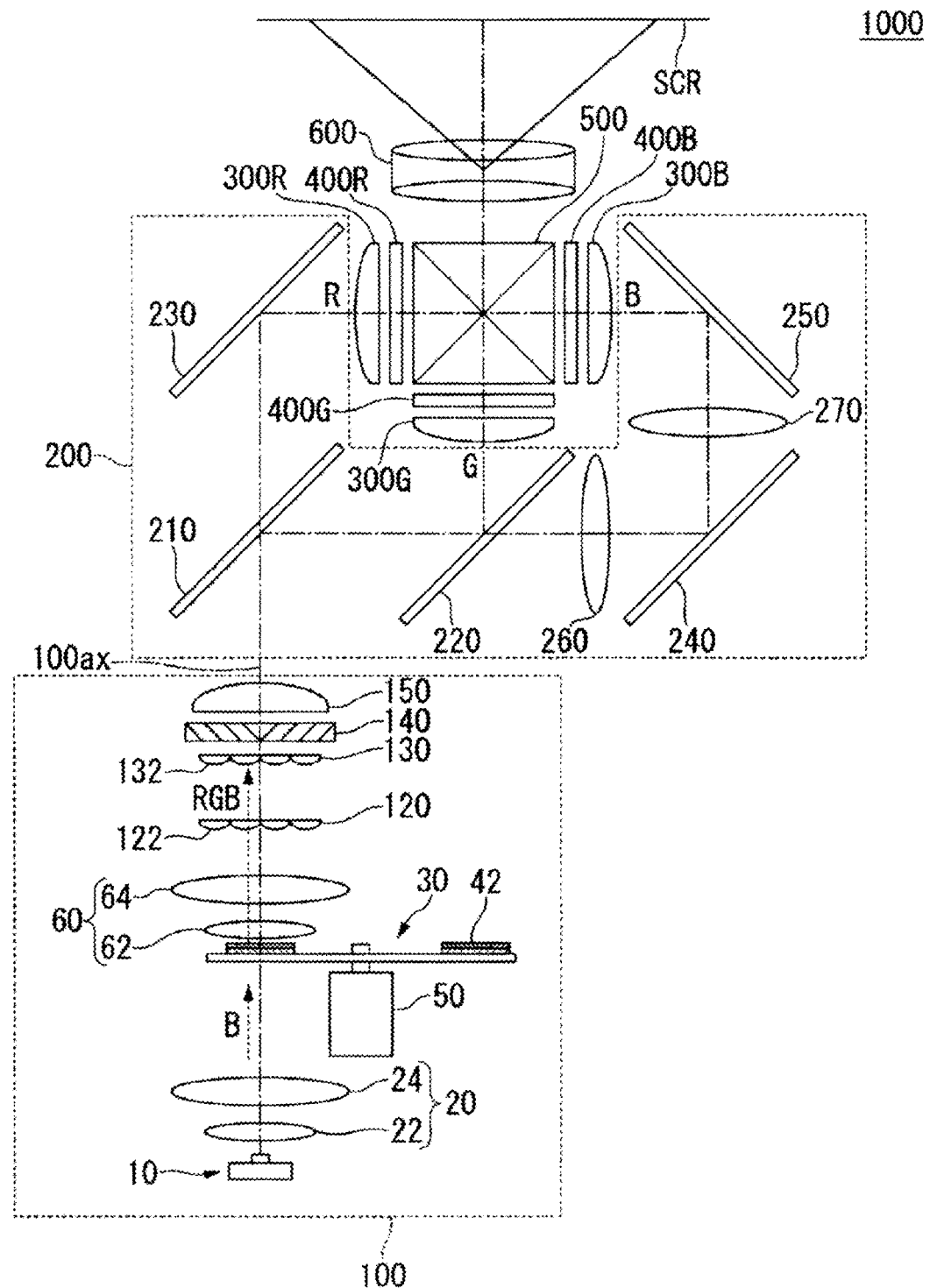
FIG. 3 is a schematic view showing a projector 1000 according to the first embodiment.
Figure 4A:
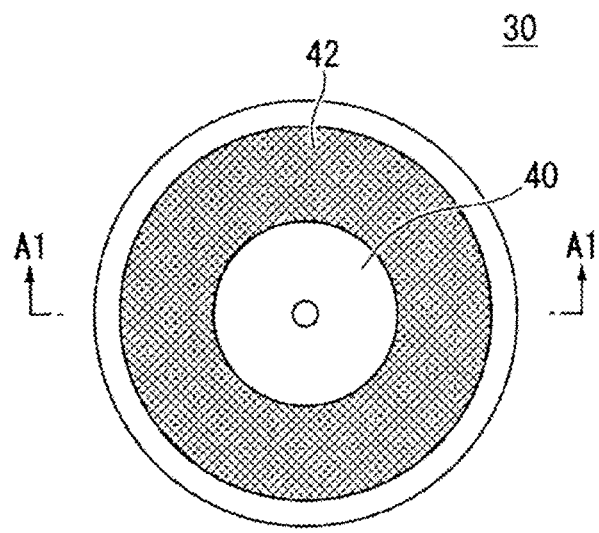
FIG. 4A is a schematic view showing a wavelength conversion element according to the first embodiment.
Figure 4B:
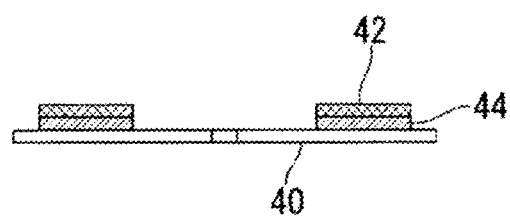
FIG. 4B is a cross-sectional view taken along the line A1-A1 of the wavelength conversion element shown in FIG. 4A.

FIG. 3 is a schematic view showing a projector 1000 according to this embodiment. FIG. 4A is a schematic view showing a wavelength conversion element included in the projector 1000. FIG. 4B is a cross-sectional view taken along the line A1-A1 of the wavelength conversion element shown in FIG. 4A.

As shown in FIG. 3, the projector 1000 of this embodiment includes a light source device 100, a color separation light guide optical system 200, a liquid crystal light modulator 400R, a liquid crystal light modulator 400G, a liquid crystal light modulator 400B, a cross dichroic prism 500, and a projection optical system 600.

The light source device 100 includes a light source 10, a condenser optical system 20, a wavelength conversion element 30, a motor 50, a collimating optical system 60, a first lens array 120, a second lens array 130, a polarization conversion element 140, and a superimposing lens 150.

The light source 10 composed of a laser light source which emits blue light (emission intensity peak: about 445 nm) composed of laser light as excitation light. The light source 10 may be composed of one laser light source or may be composed of a lot of laser light sources. Further, it is also possible to use a laser light source which emits blue light with a wavelength other than 445 nm (for example, 460 nm).

The condenser optical system 20 includes a first lens 22 and a second lens 24. The condenser optical system 20 is disposed in an optical path from the light source 10 to the wavelength conversion element 30, and makes the blue light incident on a phosphor layer 42 (described below) in a substantially condensed state. The first lens 22 and the second lens 24 are each composed of a convex lens.

As shown in FIGS. 3 and 4A, the wavelength conversion element 30 includes a substrate 40 having a circular shape in plan view, and a phosphor layer 42 provided on one surface of the substrate 40 along the circumference direction of the substrate 40. The wavelength conversion element 30 can be rotated by the motor 50 connected to the center of the substrate 40. The wavelength conversion element 30 emits red light and green light toward the opposite side to the side where blue light is incident.

The substrate 40 is composed of a material which transmits blue light. As the material of the substrate 40, for example, crystal glass, quartz, sapphire, an optical glass, a transparent resin, or the like can be used.

The blue light from the light source 10 is incident on the phosphor layer 42 from the substrate 40 side. As shown in FIG. 4B, between the phosphor layer 42 and the substrate 40, a dichroic film 44 which transmits blue light and reflects red light and green light is provided.

The phosphor layer 42 is excited by blue light with a wavelength of about 445 nm. The phosphor layer 42 converts part of the blue light from the light source 10 to light containing yellow light, and also transmits part of the remainder of the blue light without converting it. As the phosphor layer 42, the above-mentioned phosphor of this embodiment is used.

The collimating optical system 60 includes a first lens 62 and a second lens 64, and makes light from the wavelength conversion element 30 substantially parallel. The first lens 62 and the second lens 64 are each composed of a convex lens.

The first lens array 120 includes a plurality of first small lenses 122 for dividing light from the collimating optical system 60 into a plurality of partial light beams. The plurality of first small lenses 122 are arranged in a matrix in a plane orthogonal to a light source optical axis 100ax.

The second lens array 130 includes a plurality of second small lenses 132 corresponding to the plurality of first small lenses 122 of the first lens array 120. The second lens array 130 focuses the images of the respective first small lenses 122 of the first lens array 120 in the vicinity of the image formation region of each of the liquid crystal light modulator 400R, the liquid crystal light modulator 400G, and the liquid crystal light modulator 400B along with the superimposing lens 150. The plurality of second small lenses 132 are arranged in a matrix in a plane orthogonal to the light source optical axis 100ax.

The polarization conversion element 140 converts the respective partial light beams divided by the first lens array 120 to linearly polarized light.

The polarization conversion element 140 includes a polarization separation layer which transmits one linearly polarized light component among the polarized light components contained in the light from the wavelength conversion element 30 as such, and reflects the other linearly polarized light component in a direction perpendicular to the light source optical axis 100ax, a reflective layer which reflects the other linearly polarized light component reflected by the polarization separation layer in a direction parallel to the light source optical axis 100ax, and a phase difference plate which converts the other linearly polarized light component reflected by the reflective layer to the one linearly polarized light component.

The superimposing lens 150 condenses the respective partial light beams from the polarization conversion element 140 and superimposes the light beams in the vicinity of the image formation region of each the liquid crystal light modulator 400R, the liquid crystal light modulator 400G, and the liquid crystal light modulator 400B. The first lens array 120, the second lens array 130, and the superimposing lens 150 constitute an integrator optical system which makes the in-plane light intensity distribution of light from the wavelength conversion element 30 uniform.

The color separation light guide optical system 200 includes a dichroic mirror 210, a dichroic mirror 220, a reflective mirror 230, a reflective mirror 240, a reflective mirror 250, a relay lens 260, and a relay lens 270. The color separation light guide optical system 200 separates light from the light source device 100 into red light, green light, and blue light, and guides the red light, the green light, and the blue light to the corresponding liquid crystal light modulator 400R, liquid crystal light modulator 400G, and liquid crystal light modulator 400B, respectively.

Between the color separation light guide optical system 200 and each of the liquid crystal light modulator 400R, the liquid crystal light modulator 400G, and the liquid crystal light modulator 400B, a condenser lens 300R, a condenser lens 300G, and a condenser lens 300B are disposed, respectively.

The dichroic mirror 210 is a dichroic mirror which transmits a red light component and reflects a green light component and a blue light component.

The dichroic mirror 220 is a dichroic mirror which reflects a green light component and transmits a blue light component.

The red light having passed through the dichroic mirror 210 is reflected by the reflective mirror 230 and passes through the condenser lens 300R, and is incident on the image formation region of the liquid crystal light modulator 400R for red light.

The green light reflected by the dichroic mirror 210 is reflected by the dichroic mirror 220 and passes through the condenser lens 300G, and then is incident on the image formation region of the liquid crystal light modulator 400G for green light.

The blue light having passed through the dichroic mirror 220 passes through the relay lens 260, the reflective mirror 240 on the incident side, the relay lens 270, the reflective mirror 250 on the emission side, and the condenser lens 300B, and then is incident on the image formation region of the liquid crystal light modulator 400B for blue light.

The liquid crystal light modulator 400R, the liquid crystal light modulator 400G, and the liquid crystal light modulator 400B form a color image by modulating incident color light according to image information. Although the illustration is omitted, between each of the condenser lens 300R, the condenser lens 300G, and the condenser lens 300B and each of the liquid crystal light modulator 400R, the liquid crystal light modulator 400G, and the liquid crystal light modulator 400B, an incident side polarizing plate is disposed, and between the cross dichroic prism 500 and each of the liquid crystal light modulator 400R, the liquid crystal light modulator 400G, and the liquid crystal light modulator 400B, an emission side polarizing plate is disposed.

The cross dichroic prism 500 forms a color image by combining the respective image light emitted from the liquid crystal light modulator 400R, the liquid crystal light modulator 400G, and the liquid crystal light modulator 400B.

The color image emitted from the cross dichroic prism 500 is expanded and projected by the projection optical system 600, and an image is formed on a screen SCR.

In order to efficiently incorporate fluorescence emitted from the phosphor layer 42 by the collimating optical system 60, the area of the region where the fluorescence is emitted from the phosphor layer 42 is desirably small.

However, in the case of an inorganic phosphor, "blurring" in which fluorescence is emitted from the position where the excitation light is incident while spreading in a plane direction occurs due to the following mechanism. Therefore, the area of the region where fluorescence is emitted is easily increased.

Figure 5A:
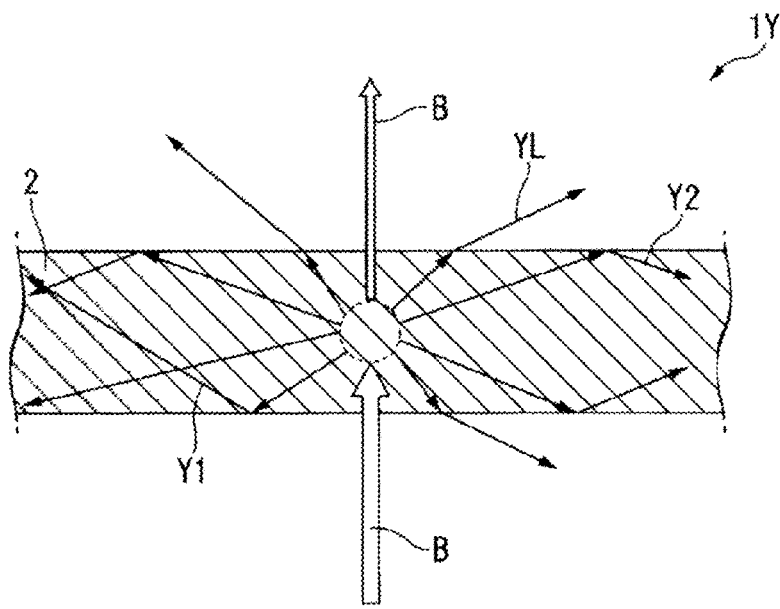
FIG. 5A is a schematic view showing a manner of blurring in an inorganic phosphor which contains neither a subphase nor a void.
Figure 5B:
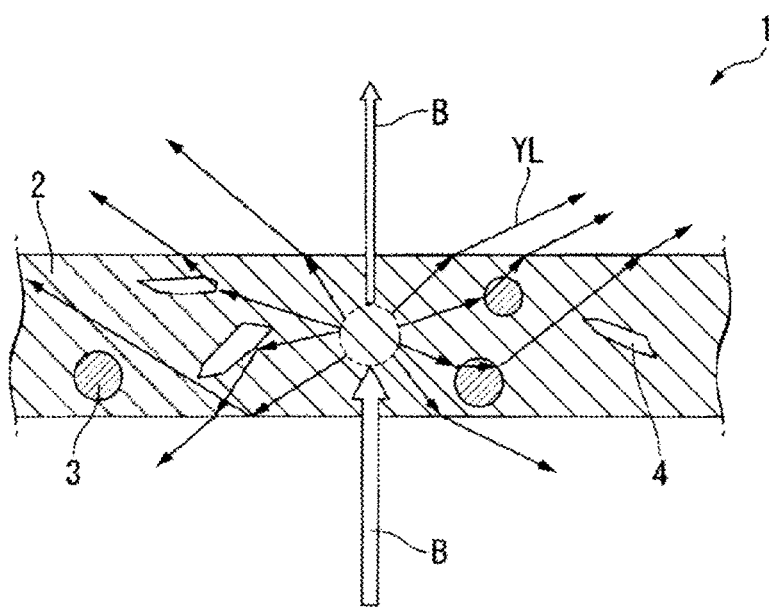
FIG. 5B is a schematic view showing a manner of blurring in the phosphor of the first embodiment.

FIG. 5A is a schematic view showing a manner of blurring in a phosphor 1Y which is an inorganic phosphor composed only of the main phase 2 of Ce:YAG and containing no subphases or voids. FIG. 5B is a schematic view showing a manner of blurring in the phosphor 1 of this embodiment.

As shown in FIG. 5A, in the phosphor 1Y, part of the fluorescence traveling inside the phosphor 1Y is totally reflected by the surface of the phosphor 1Y and is transmitted in an in-plane direction. The fluorescence totally reflected inside the phosphor 1Y is shown by the symbols Y1 and Y2 in the drawing.

The phosphor 1Y is composed only of the main phase 2, and therefore, even if a crystal grain boundary is present, fluorescence YL is hardly refracted or reflected inside the phosphor 1Y. Due to this, fluorescence travels inside the phosphor 1Y from the position where the excitation light B is incident to the position away therefrom in an in-plane direction, and then is emitted outside the phosphor 1Y, and as a result, "blurring" is observed.

On the other hand, as shown in FIG. 5B, in the phosphor 1 of this embodiment, fluorescence is refracted or reflected by the subphase 3 or the void 4, and therefore, the traveling direction of the fluorescence is easily changed. Therefore, the fluorescence YL emitted at an angle where the fluorescence is totally reflected by the surface of the phosphor 1 in the case where the subphase 3 or the void 4 is not present is also incident on the surface of the phosphor 1 at a traveling angle different from the total reflection conditions by changing the traveling direction, and is easily emitted to the outside from the phosphor 1. As a result, in the phosphor 1, fluorescence in the inside is easily emitted to the outside of the phosphor as compared with the phosphor 1Y, and thus, "blurring" is reduced.

In the case where the phosphor 1 of this embodiment is used in the wavelength conversion element 30, parameters such as the amount of the crystal grain 3a, the void amount ρ, and the shape thereof have a correlation with the amount of "blurring" as described in detail below. Due to this, the blurring may be adjusted by appropriately designing the phosphor 1.

Figure 6:
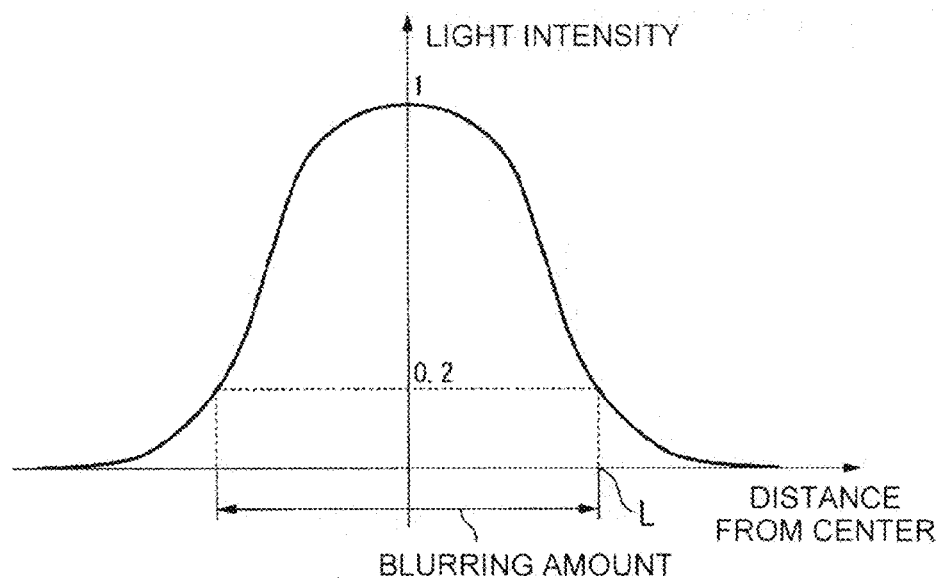
FIG. 6 shows an example of an emission profile for illustrating blurring.

In this embodiment, the "blurring amount" is defined as follows. A region with a diameter of 0.4 mm on a phosphor is uniformly irradiated with excitation light, and an emission profile of fluorescence emitted from the phosphor is measured. The relationship between the distance from the center of the region irradiated with the excitation light and the emission intensity is shown in FIG. 6 as the emission profile. The vertical axis represents the light intensity, and the horizontal axis represents the distance from the center. In the emission profile, a distance which is twice the distance L at which the light intensity is 20% of the maximum is defined as the "blurring amount" (unit: mm).

Figure 7:
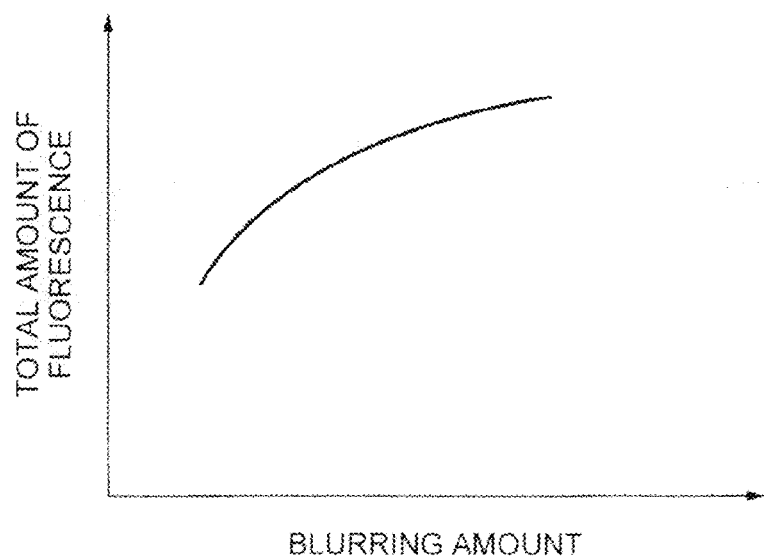
FIG. 7 is a graph schematically showing the relationship between the blurring amount and the amount of fluorescence emitted from a wavelength conversion element.

FIG. 7 is a graph schematically showing the relationship between the blurring amount and the total amount of fluorescence emitted from a wavelength conversion element, and the horizontal axis represents the blurring amount, and the vertical axis represents the total amount of fluorescence. The result that the blurring amount is large corresponds to the fact that the void amount ρ is small, and the fact that the void amount ρ is small corresponds to the fact that the sintering temperature is high. When the sintering temperature is high and the void amount ρ is small, the excitation light which is backscattered without being absorbed decreases and the amount of fluorescence increases, and therefore, the relationship between the blurring amount and the total amount of fluorescence roughly has a tendency as shown in FIG. 7, and there is a correlation that when the blurring amount increases, the amount of fluorescence increases.

Due to this, when attention is focused only on the reduction of the blurring amount, another problem may arise that the amount of light as a light source of a projector is lacking or the amount of fluorescence for generating white light by mixing with blue excitation light is decreased, and therefore, a color balance is lost.

Figure 8:
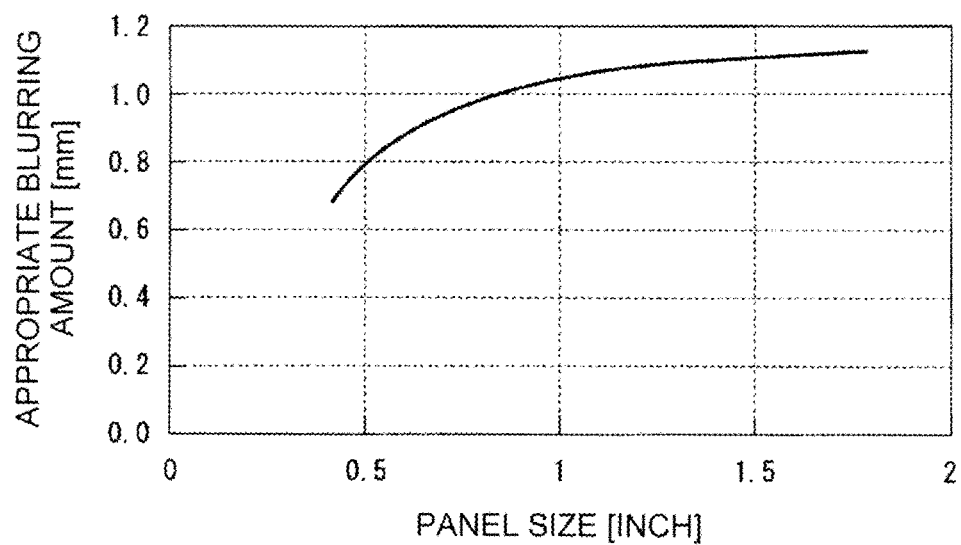
FIG. 8 is a graph showing the relationship between the blurring amount and the size of a liquid crystal light modulator.

In a projector like the projector 1000 of this embodiment, as for the size of the liquid crystal light modulator, a liquid crystal light modulator with a diagonal length of about 0.4 inches to 1.2 inches is used. From the results of an examination by the present inventors shown in FIG. 8, it was found that a blurring amount of about 0.7 mm is desired for a liquid crystal light modulator with a diagonal length of 0.4 inches, and a blurring amount of about 1.1 mm is desired for a liquid crystal light modulator with a diagonal length of 1.2 inches.

Such a blurring amount is controlled as described below.

Figure 9:
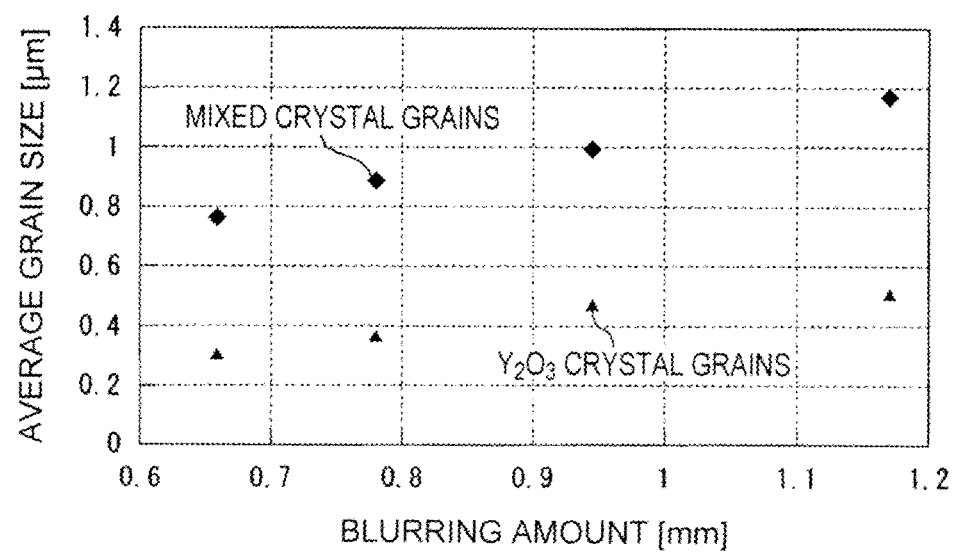
FIG. 9 is a graph showing the relationship between the blurring amount and the average crystal grain size of crystal grains.

FIG. 9 is a graph showing the relationship between the blurring amount and the average crystal grain size of crystal grains, and the horizontal axis represents the blurring amount (mm), and the vertical axis represents the average crystal grain size (μm) of crystal grains. In FIG. 9, the mixed crystal grains mean a mixture of Ce:YAP crystal grains and Ce:YAG crystal grains.

When the average crystal grain size is increased, the boundaries by which light is refracted or reflected are reduced, and therefore, the blurring amount tends to increase. The crystal grain size can be adjusted by controlling the sintering time and sintering temperature.

From FIG. 9, it is found that the average crystal grain size of the mixed crystal grains is preferably 0.8 μm or more and 1.2 μm or less, and the average crystal grain size of $Y_2O_3$ is preferably 0.33 μm or more and 0.50 μm or less.

Figure 10:
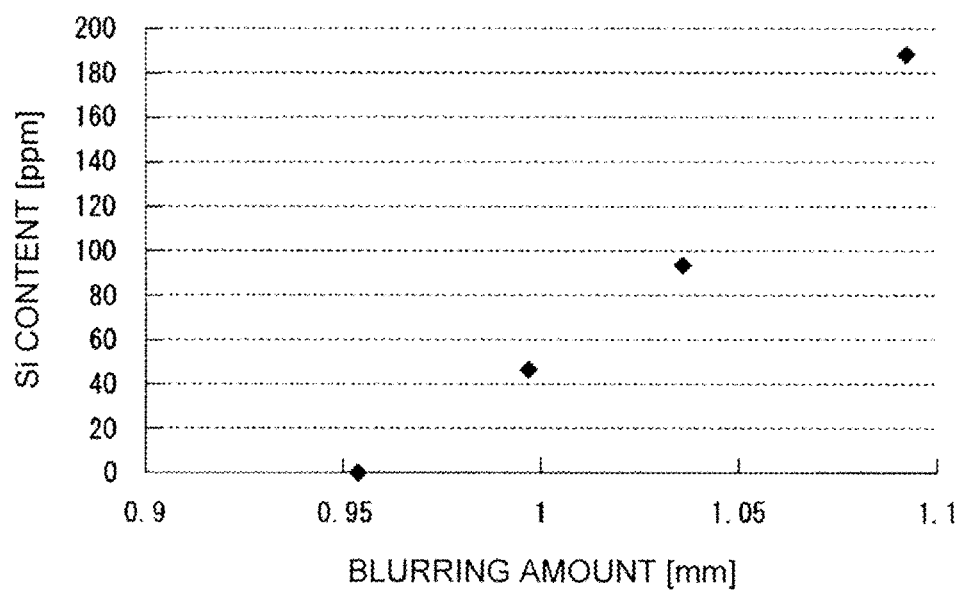
FIG. 10 is a graph showing the relationship between the blurring amount and the mass of a sintering aid (Si content).

FIG. 10 is a graph showing the relationship between the blurring amount and the Si content in the case where an Si-based sintering aid was used during sintering, and the horizontal axis represents the blurring amount (mm), and the vertical axis represents the Si content (ppm) in the phosphor. When the Si content is high, that is, when the sintering aid is used in a large amount during sintering, sintering easily proceeds, and the voids are reduced, and as a result, the blurring amount tends to increase.

From FIG. 10, it is found that the Si content is preferably 200 ppm or less.

In consideration of the relationship between the blurring amount and the void amount ρ, when the void amount ρ decreases, the boundaries by which light is refracted or reflected are reduced, and therefore, the blurring amount tends to increase. The void amount ρ can be adjusted by controlling the sintering time and sintering temperature.

As described above, by appropriately controlling the respective parameters associated with the blurring amount, the wavelength conversion element 30 including the phosphor layer 42 with an appropriate blurring amount can be formed. Further, in the projector 1000 including the light source device 100 having such a wavelength conversion element 30, the utilization efficiency of fluorescence emitted from the phosphor layer 42 is high, and therefore, a bright image can be projected.

According to the phosphor having a configuration as described above, balance between thermal conductivity and light scattering property can be achieved.

Further, the wavelength conversion element having a configuration as described above includes the phosphor as described above, and therefore, is hardly damaged by heat, and also has a desired light scattering property, and therefore has high reliability. The light source device and the projector including the above-mentioned wavelength conversion element have high reliability.

Incidentally, in this embodiment, the projector 1000 has been described, however, the configuration of the projector is not limited thereto.

Figure 11:
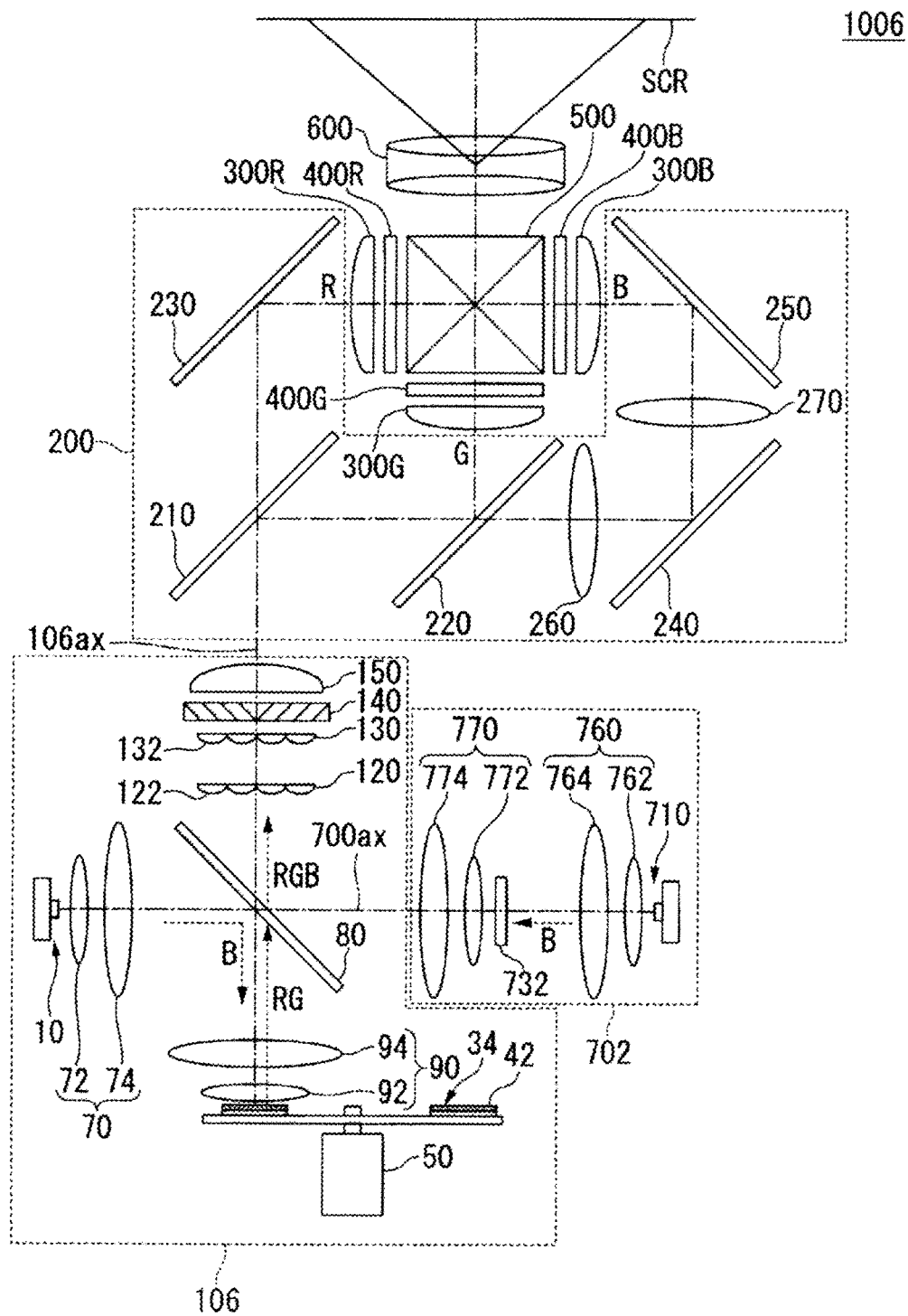
FIG. 11 is a schematic view illustrating a projector 1006 of a modification example of the first embodiment.

FIG. 11 is a schematic view illustrating a projector 1006 of a modification example, and is a view corresponding to FIG. 3. In the following description, the members common to those of the projector 1000 are denoted by the same reference numerals and signs, and the description thereof will be omitted. The projector 1006 includes a light source device 106 and a second light source device 702 in place of the light source device 100 in the projector 1000. The light source device 106 includes a wavelength conversion element 34, a collimating optical system 70, a dichroic mirror 80, and a collimating condenser optical system 90.

The light source 10 is disposed such that the optical axis is orthogonal to a light source optical axis 106ax.

The collimating optical system 70 includes a first lens 72 and a second lens 74 and makes light from the light source 10 substantially parallel. The first lens 72 and the second lens 74 are each composed of a convex lens.

The dichroic mirror 80 is disposed in an optical path from the collimating optical system 70 to a collimating condenser optical system 90 to cross each of the optical axis of the light source 10 and the light source optical axis 106ax at an angle of 45°. The dichroic mirror 80 reflects blue light and transmits red light and green light.

The collimating condenser optical system 90 has a function to make blue light from the dichroic mirror 80 incident on a phosphor layer 42 in a substantially condensed state and a function to make fluorescence emitted from the phosphor layer 42 substantially parallel. The collimating condenser optical system 90 includes a first lens 92 and a second lens 94. The first lens 92 and the second lens 94 are each composed of a convex lens.

Figure 12A:
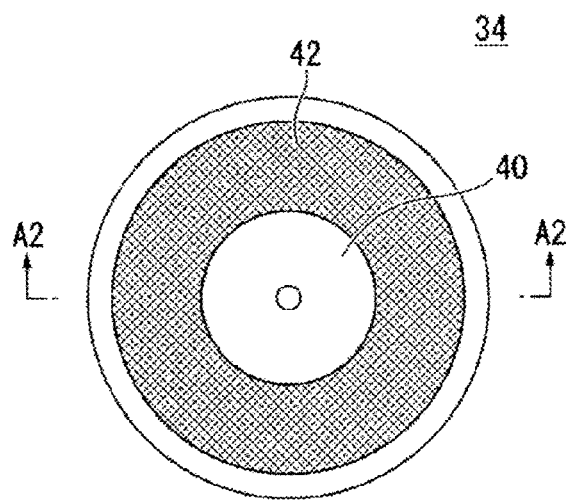
FIG. 12A is a schematic view showing a wavelength conversion element according to a modification example of the first embodiment.
Figure 12B:
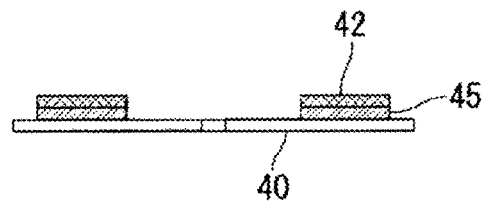
FIG. 12B is a cross-sectional view taken along the line A2-A2 of the wavelength conversion element shown in FIG. 12A.

FIG. 12A is a schematic view showing the wavelength conversion element included in the projector 1006. FIG. 12B is a cross-sectional view taken along the line A2-A2 of the wavelength conversion element shown in FIG. 12A. As shown in FIG. 12A, the wavelength conversion element 34 includes a phosphor layer 42 provided on one surface of a substrate 40 along the circumference direction of the substrate 40. In the light source device 106, blue light from the light source 10 is incident on the phosphor layer 42 from the opposite side to the substrate 40. As shown in FIG. 12B, between the phosphor layer 42 and the substrate 40, a reflective film 45 which reflects visible light is provided. Due to this, fluorescence is emitted toward the side where blue light is incident.

It is not necessary to use a disk composed of a material which transmits excitation light as the substrate 40, and a disk composed of a material which is not transparent such as a metal may be used.

The second light source device 702 includes a second light source device 710, a condenser optical system 760, a scattering plate 732, and a collimating optical system 770.

The condenser optical system 760 includes a first lens 762 and a second lens 764. The condenser optical system 760 condenses blue light from the second light source device 710 in the vicinity of the scattering plate 732. The first lens 762 and the second lens 764 are each composed of a convex lens.

The scattering plate 732 scatters blue light from the second light source device 710, and generates blue light having a light distribution similar to that of fluorescence emitted from the wavelength conversion element 34. As the scattering plate 732, for example, a microlens array can be used.

The collimating optical system 770 includes a first lens 772 and a second lens 774, and makes light from the scattering plate 732 substantially parallel. The first lens 772 and the second lens 774 are each composed of a convex lens.

The dichroic mirror 80 combines blue light from the second light source device 702 and yellow light from the wavelength conversion element 34 and generates white light.

Also in the wavelength conversion element 34 as described above, by using the phosphor 1 of this embodiment, the wavelength conversion element 34 which is hardly damaged by heat and also has a desired light scattering property can be formed. Further, a light source device and a projector having high reliability can be provided.

Figure 13:
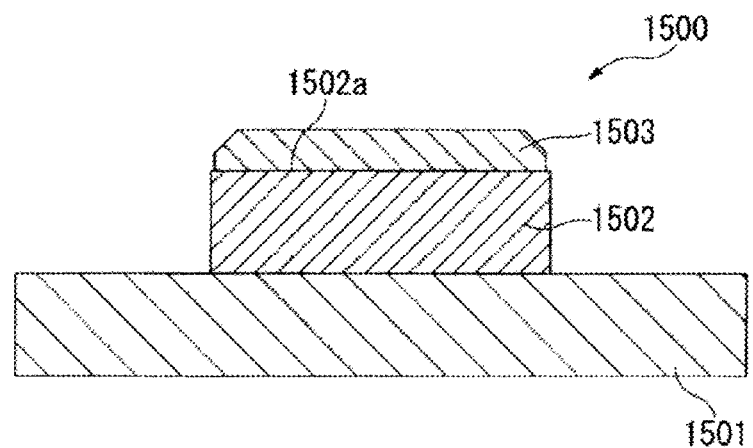
FIG. 13 is a schematic view showing a light source device 1500 of the first embodiment.

FIG. 13 is a schematic view showing another example of the light source device. A light source device 1500 includes a light source for excitation (light source) 1502 provided on a substrate 1501 and a phosphor layer 1503 provided on the side of a light emission surface 1502a of the light source for excitation 1502.

As the light source for excitation 1502, any of various types can be adopted as long as it emits blue excitation light.

In the phosphor layer 1503, the above-mentioned phosphor of this embodiment is used as a constituent material.

In the light source device 1500 having such a configuration, by using the phosphor 1 of this embodiment, the light source device 1500 which is hardly damaged by heat and also has a desired light scattering property, and therefore has high reliability can be formed.

Second Embodiment

Hereinafter, a wavelength conversion element, a light source device, and a projector according to a second embodiment will be described with reference to FIGS. 14 to 19B.

Figure 14:
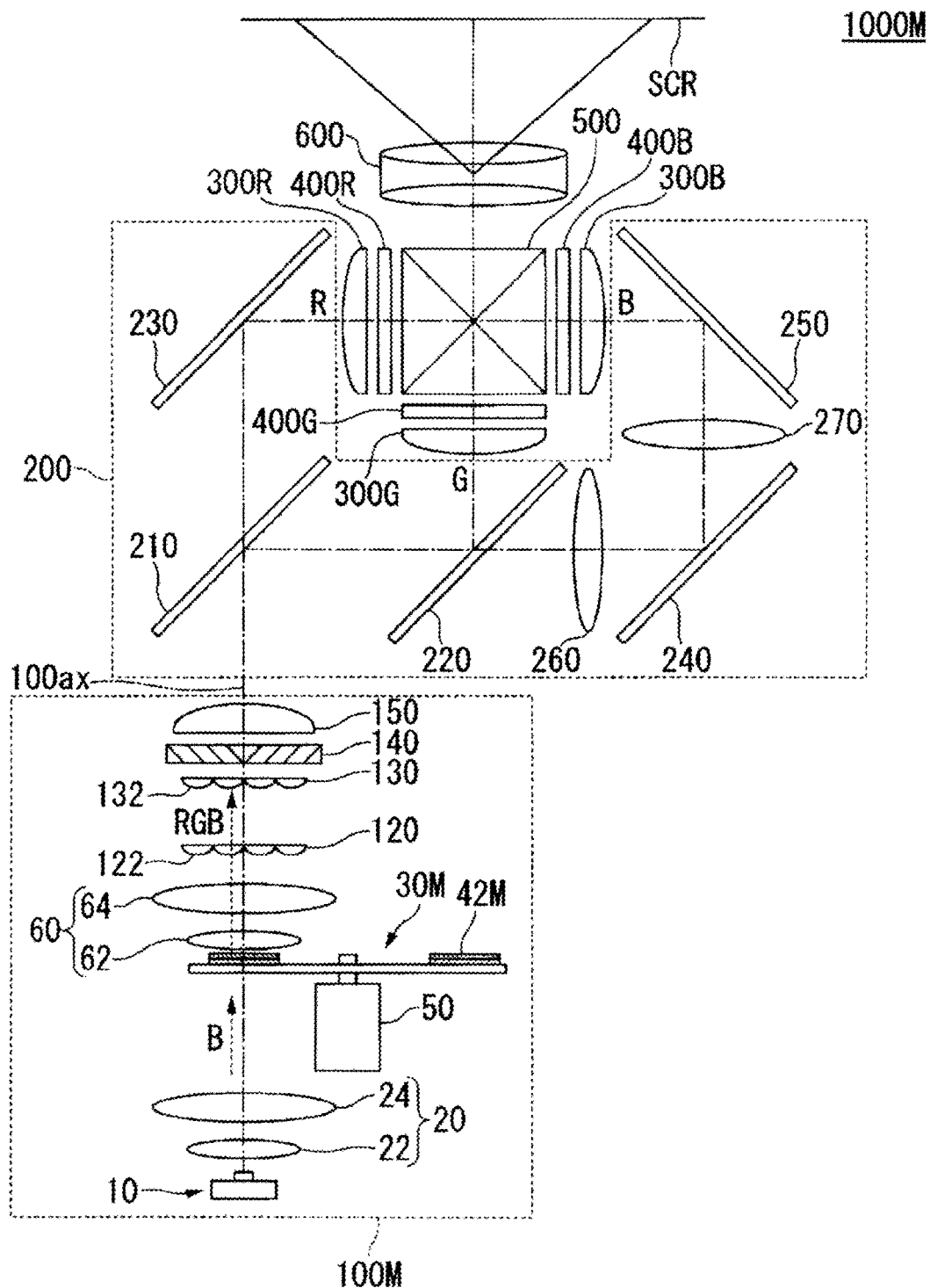
FIG. 14 is a schematic view showing a projector according to a second embodiment.

FIG. 14 is a schematic view showing a projector 1000M according to this embodiment. The projector 1000M is different from the projector 1000 according to the first embodiment in that it includes a light source device 100M in place of the above-mentioned light source device 100. The light source device 100M is different from the light source device 100 in that it includes a wavelength conversion element 30M in place of the above-mentioned wavelength conversion element 30. The other configuration is the same as that of the projector 1000, and therefore, the same elements as in FIG. 3 are denoted by the same reference numerals and signs, and a detailed description thereof will be omitted.

The light source device 100M includes a light source 10, a condenser optical system 20, a wavelength conversion element 30M, a motor 50, a collimating optical system 60, a first lens array 120, a second lens array 130, a polarization conversion element 140, and a superimposing lens 150.

The condenser optical system 20 is disposed in an optical path from the light source 10 and the wavelength conversion element 30M, and makes blue light incident on a phosphor layer 42M in a substantially condensed state. The phosphor layer 42M will be described later.

The collimating optical system 60 makes light from the wavelength conversion element 30M substantially parallel.

Figure 15A:
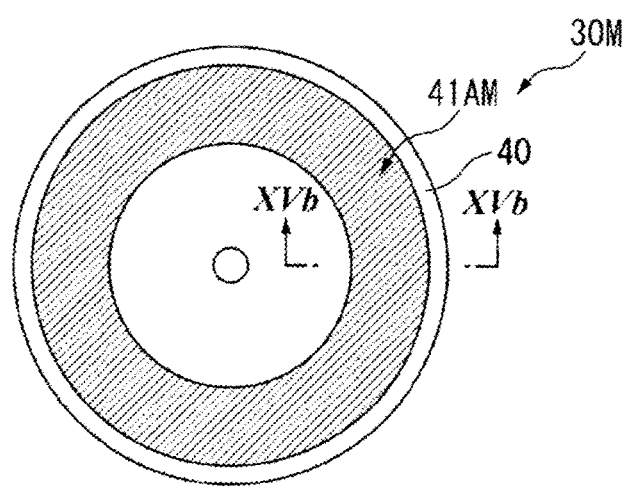
FIG. 15A is a schematic view showing a wavelength conversion element according to the second embodiment.
Figure 15B:
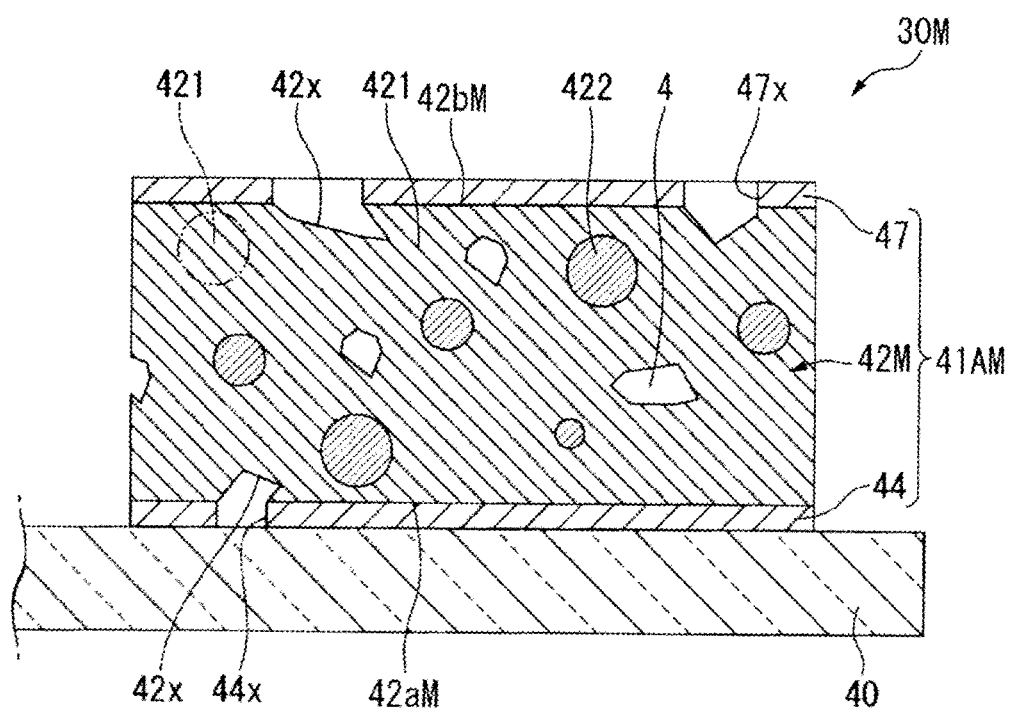
FIG. 15B is a cross-sectional view on arrow XVb-XVb of the wavelength conversion element shown in FIG. 15A.

FIG. 15A is a schematic view showing the wavelength conversion element 30M, and FIG. 15B is a cross-sectional view on arrow taken along the line XVb-XVb in FIG. 15A.

As shown in FIG. 15A, the wavelength conversion element 30M includes a substrate 40 having a circular shape in plan view, and a wavelength conversion section 41AM provided on one surface of the substrate 40 along the circumference direction of the substrate 40. As shown in FIG. 15B, the wavelength conversion section 41AM includes a phosphor layer 42M, a dichroic film 44 provided on a first surface 42aM of the phosphor layer 42M, and an antireflective film 47 provided on a second surface 42bM of the phosphor layer 42M. The phosphor layer 42M is provided on one surface of the substrate 40 along the circumference direction of the substrate 40. The wavelength conversion element 30M can be rotated by the motor 50 connected to the center of the substrate 40. The wavelength conversion element 30M emits red light and green light toward the opposite side to the side where blue light is incident. The dichroic film 44 and the antireflective film 47 each correspond to the optical functional layer described in the appended claims.

The phosphor layer 42M is excited by blue light with a wavelength of about 445 nm which is emitted from the light source 10 and is incident on the phosphor layer 42M from the substrate 40 side. The phosphor layer 42M converts part of the blue light from the light source 10 to light containing yellow light, and also transmits part of the remainder of the blue light without converting it.

The phosphor layer 42M is composed of a sintered body obtained by sintering a plurality of first crystallites 421 composed of a fluorescent ceramic material and a plurality of second crystallites 422 composed of a ceramic material having a refractive index different from that of the first crystallites 421. The first crystallite 421 corresponds to the main phase, and the second crystallite 422 corresponds to the subphase (first crystal grain). The phosphor layer 42M is obtained by subjecting the sintered body to processing such as cutting or polishing. In FIG. 15B, for the sake of simplification, one first crystallite 421 is shown by an alternate long and two short dashes line, and the other first crystallites 421 are shown as those forming a continuous unified layer.

As the first crystallite 421, any of various materials can be used as long as it is a fluorescent ceramic material. In the phosphor layer 42M of this embodiment, as the first crystallite 421, Ce:$Y_3Al_5O_{12}$ (hereinafter referred to as "Ce:YAG") was used.

As the second crystallite 422, any of various materials can be used as long as it is a ceramic material having a refractive index different from that of the first crystallite 421. In the phosphor layer 42M of this embodiment, as the second crystallite 422, YAP was used. In place of YAP, for example, $Al_2O_3$, Ce:$Y_2O_3$, Ce:YAP, $CeO_2$, or $Y_2O_3$ can also be used. $Al_2O_3$, $CeO_2$, and $Y_2O_3$ are starting materials to be used in the synthesis of Ce:YAG. Further, YAP is a by-product generated when synthesizing Ce:YAG. As described above, Ce:YAP or Ce:$Y_2O_3$ improves the quantum yield of the phosphor.

The phosphor layer 42M may contain a third crystallite composed of a ceramic material which has a refractive index different from that of the first crystallite 421 and also is different from the second crystallite 422. The third crystallite corresponds to the second crystal grain. As the third crystallite, for example, YAP, $Al_2O_3$, Ce:$Y_2O_3$, Ce:YAlO$_3$, $CeO_2$, or $Y_2O_3$ can also be used. Incidentally, at least one of the first crystallite 421, the second crystallite 422, and the third crystallite may contain metal impurities contained in the starting material or the like.

The sintered body has a crystal grain boundary, and also has a void 4 at the crystal grain boundary. The void 4 is generated at the crystal grain boundary when producing the sintered body. When the phosphor layer 42M is formed by processing the sintered body, the void 4 present inside the sintered body is exposed on the surface of the phosphor layer 42M. Due to this, a concave portion 42x derived from the void 4 is present on the surface of the phosphor layer 42M.

When the sintered body contains a lot of voids 4, also a lot of concave portions 42x are present on the surface of the phosphor layer 42M. Therefore, in order to form the optical functional layer in a favorable state on the surface of the phosphor layer 42M, it is preferred that the void amount ρ is smaller. Further, as the void amount ρ is smaller, the thermal conductivity of the phosphor layer 42M is higher, and therefore, the breakage of the phosphor layer 42M due to thermal stress hardly occurs. On the other hand, as described above, the void 4 has a function to scatter light traveling inside the phosphor layer 42M. Therefore, the void amount ρ may be set in consideration of the physical properties required for the phosphor layer 42M, that is, thermal conductivity and a light scattering property.

In order to decrease the effect of accumulation of heat in the phosphor layer 42M, the thermal conductivity of the phosphor layer 42M is preferably 9 W/m·k or more at 25° C. In order to achieve such thermal conductivity, the void amount ρ is preferably 0.01% or more and less than 5%.

The second crystallite 422 is present at the crystal grain boundary of the first crystallite 421. In the phosphor layer 42M, the volume of the first crystallite 421 is larger than the volume of the second crystallite 422.

This phosphor layer 42M can be produced as follows. First, by using the method for producing the phosphor 1 according to the first embodiment, the sintered body containing first crystallites 421, the second crystallites 422, and the voids 4 is produced. Subsequently, the obtained sintered body is subjected to processing such as cutting or polishing, whereby the phosphor layer 42M having a desired thickness is obtained.

The dichroic film 44 is a dielectric multilayer film provided between the phosphor layer 42M and the substrate 40. The dichroic film 44 is formed by a gas-phase method on the first surface 42aM of the phosphor layer 42M after obtaining the phosphor layer 42M by processing the sintered body. At this time, at a position where the dichroic film 44 is overlapped with the concave portion 42x of the phosphor layer 42M, a defective part 44x in which the dichroic film 44 is not formed in a desired state is formed.

The antireflective film 47 is a dielectric multilayer film provided on the second surface 42bM of the phosphor layer 42M. The antireflective film 47 is formed by a gas-phase method on the second surface 42bM of the phosphor layer 42M after obtaining the phosphor layer 42M by processing the sintered body. At this time, at a position where the antireflective film 47 is overlapped with the concave portion 42x of the phosphor layer 42M, a defective part 47x in which the antireflective film 47 is not formed in a desired state is formed.

Figure 16:
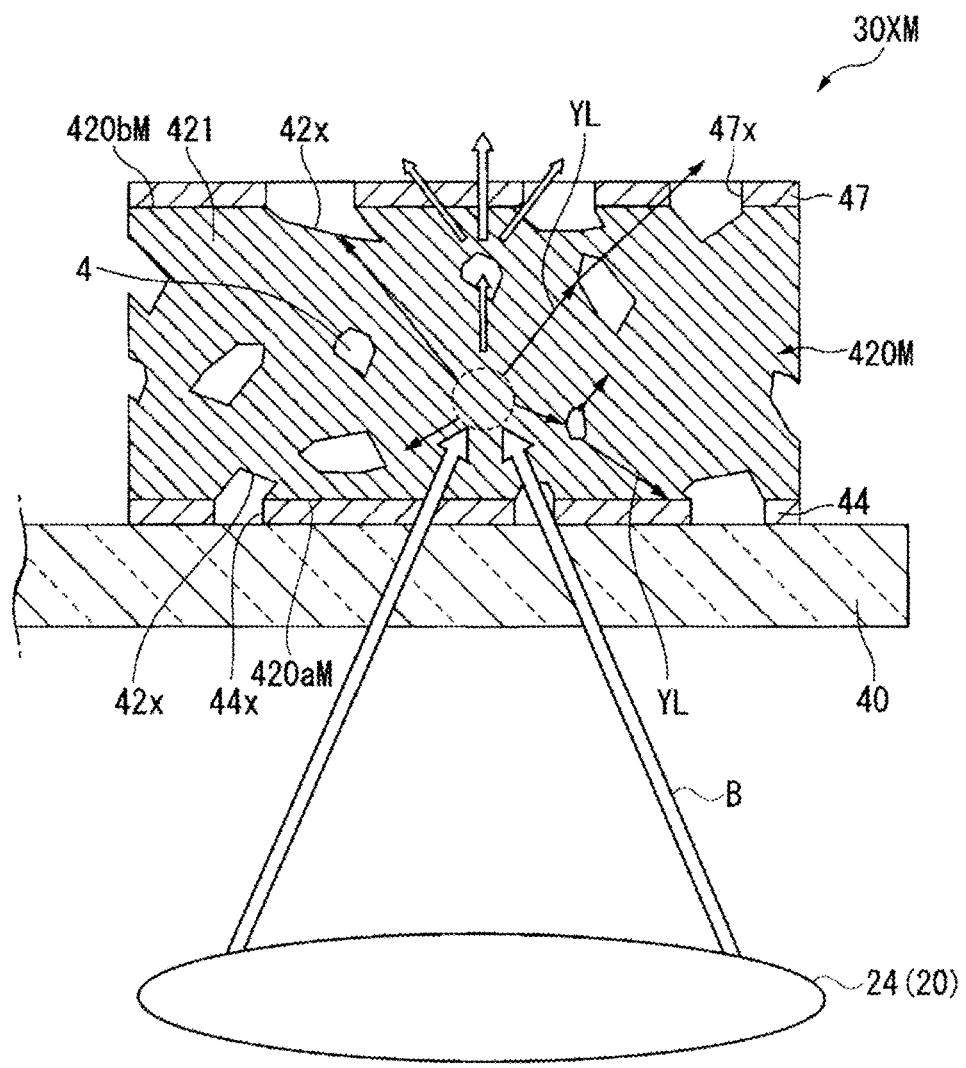
FIG. 16 is a view showing a wavelength conversion element having a phosphor layer which does not contain a second crystallite.
Figure 17:
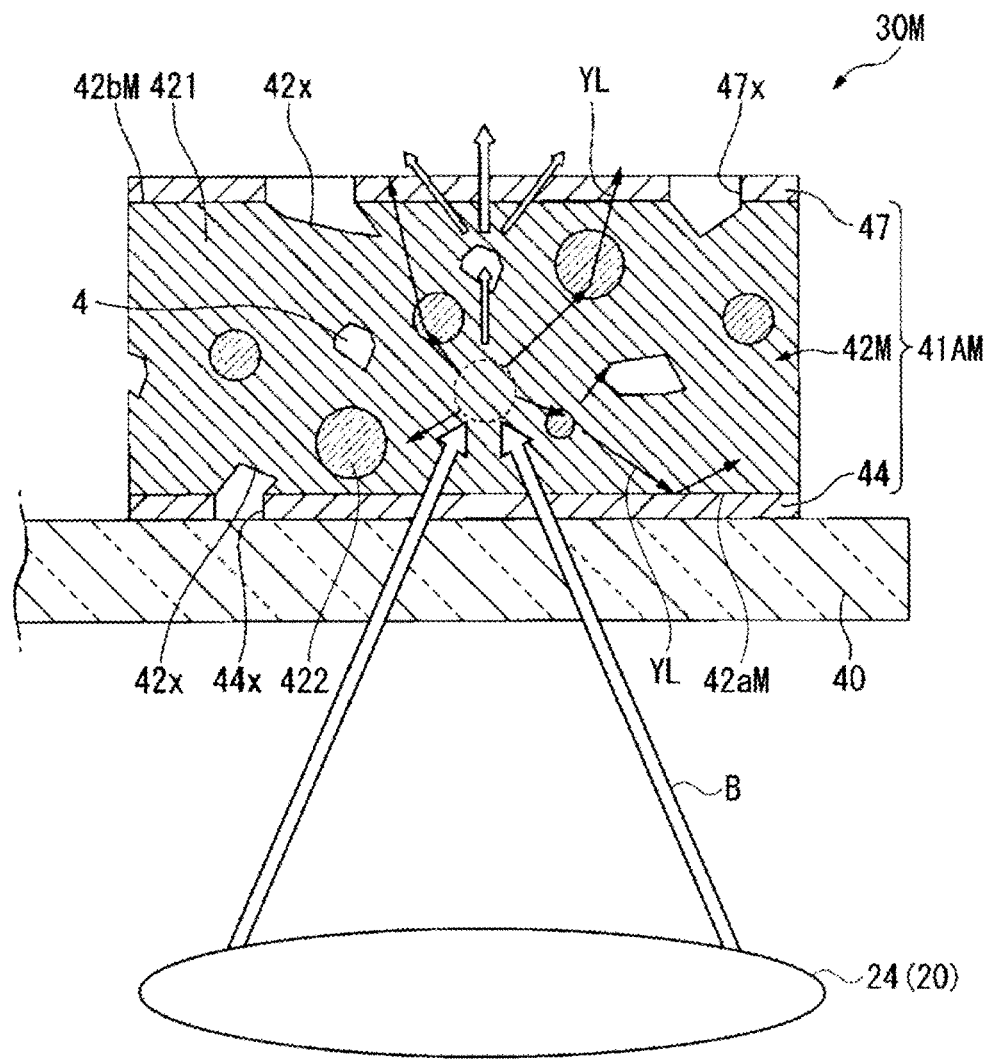
FIG. 17 is a view showing a manner of a wavelength conversion element of the second embodiment.

In the wavelength conversion element 30M, the following emission behavior is exhibited. FIG. 16 is a schematic view showing a manner of emission when a wavelength conversion element 30XM having a phosphor layer 420M which does not contain the second crystallite 422 as a comparative example is irradiated with excitation light B. FIG. 17 is a schematic view showing a manner of emission when the wavelength conversion element 30M of this embodiment is irradiated with excitation light B.

When the wavelength conversion element 30XM shown in FIG. 16 is irradiated with excitation light B through a condenser optical system 20, the excitation light B passes through a dichroic film 44 and is incident on the phosphor layer 420M. In the phosphor layer 420M, a first crystallite 421 absorbs part of the excitation light B, and yellow fluorescence YL is isotropically emitted. The fluorescence YL travels inside the phosphor layer 420M while being scattered by the void 4 present inside the phosphor layer 420M, and is emitted outside the phosphor layer 420M.

The remainder of the excitation light B which was not absorbed by the first crystallite 421 passes through the phosphor layer 420M. At this time, the remainder passes through the phosphor layer 420M while being scattered by the void 4 in the same manner as the fluorescence YL. Due to this, from the phosphor layer 420M, white light in which the excitation light B and the fluorescence YL are mixed with each other is emitted.

The phosphor layer 420M includes a lot of voids 4 for sufficiently scatter the excitation light B or the fluorescence YL. Due to this, on the surface of the phosphor layer 420M, a lot of concave portions 42x are formed. FIG. 16 shows that three concave portions 42x on a first surface 420aM, three concave portions 42x on a second surface 420bM, and a total of 6 concave portions 42x are formed.

Therefore, the dichroic film 44 provided in contact with the first surface 420aM of the phosphor layer 420M has a lot of defective parts 44x, and the antireflective film 47 provided in contact with the second surface 420bM has a lot of defective parts 47x. Due to this, the respective films hardly exhibit desired physical properties.

Further, the phosphor layer 420M includes a lot of voids 4, and therefore, the thermal conductivity of the phosphor layer 420M as a whole is lower than the thermal conductivity of Ce:YAG constituting the first crystallite 421. Therefore, when the phosphor layer 420M is irradiated with high-intensity excitation light B, heat is easily accumulated therein, and breakage due to thermal stress easily occurs.

On the other hand, in the wavelength conversion element 30M shown in FIG. 17, a plurality of second crystallites 422 having a refractive index different from that of the first crystallites 421 are included in the phosphor layer 42M. The second crystallite 422 can scatter the excitation light B or the fluorescence YL by refraction or reflection. That is, the second crystallite 422 favorably functions as a scattering source. Due to this, in the phosphor layer 42M, the void amount ρ can be reduced than the void amount ρ in the phosphor layer 420M while making the ability to scatter the excitation light B or the fluorescence YL equal to that of the phosphor layer 420M. As a result, not only the amount of concave portions 42x is decreased, but also the thermal conductivity of the phosphor layer 42M is increased.

FIG. 17 shows that one concave portion 42x on the first surface 42aM, and two concave portions 42x on the second surface 42bM, and a total of 3 concave portions 42x are formed. As a result, in the dichroic film 44 provided in contact with the first surface 42aM of the phosphor layer 42M, and in the antireflective film 47 provided in contact with the second surface 42bM, the amount (number) of defective parts 44x and 47x is smaller than the comparative example, and the physical properties of the respective films are improved. That is, the physical properties of the respective films approach the ideal physical properties (set values).

The wavelength conversion element 30M includes an optical functional layer having favorable properties on the surface thereof. Specifically, the amount (number) of defective parts 44x of the dichroic film 44 is small, and therefore, the fluorescence YL generated in the phosphor layer 42M is reflected by the dichroic film 44 with higher efficiency than the comparative example, and can be emitted from the phosphor layer 42M in the opposite direction to the substrate 40. Further, the amount (number) of defective parts 47x of the antireflective film 47 is small, and therefore, the fluorescence YL can be emitted to the outside from the second surface 42bM with higher efficiency than the comparative example. In this manner, the fluorescence YL generated in the phosphor layer 42M can be extracted in a desired direction with high efficiency.

In addition, the thermal conductivity of the phosphor layer 42M is higher than the comparative example, and therefore, even if a small region is irradiated with high-intensity excitation light B, heat is hardly accumulated therein, and thus, breakage due to thermal stress hardly occurs.

In the sintered body containing YAP as the second crystallite 422, as compared with the case where YAP is not contained, when the sintered body is produced, the crystallite sizes of the first crystallite 421 and the second crystallite 422 tend to be decreased. When the crystallite sizes of the crystallites constituting the sintered body are small, the bending strength of the sintered body is high. Therefore, in the phosphor layer 42M containing YAP, breakage due to thermal stress hardly occurs.

The light source device 100M according to this embodiment includes the wavelength conversion element 30M, and therefore can emit high-luminance light, and also is hardly damaged by heat.

The projector 1000M according to this embodiment includes the light source device 100M, and therefore can project a high-luminance image, and also is hardly damaged by heat.

Although in this embodiment, the projector 1000M has been described, however, the configuration of the projector is not limited thereto.

Figure 18:
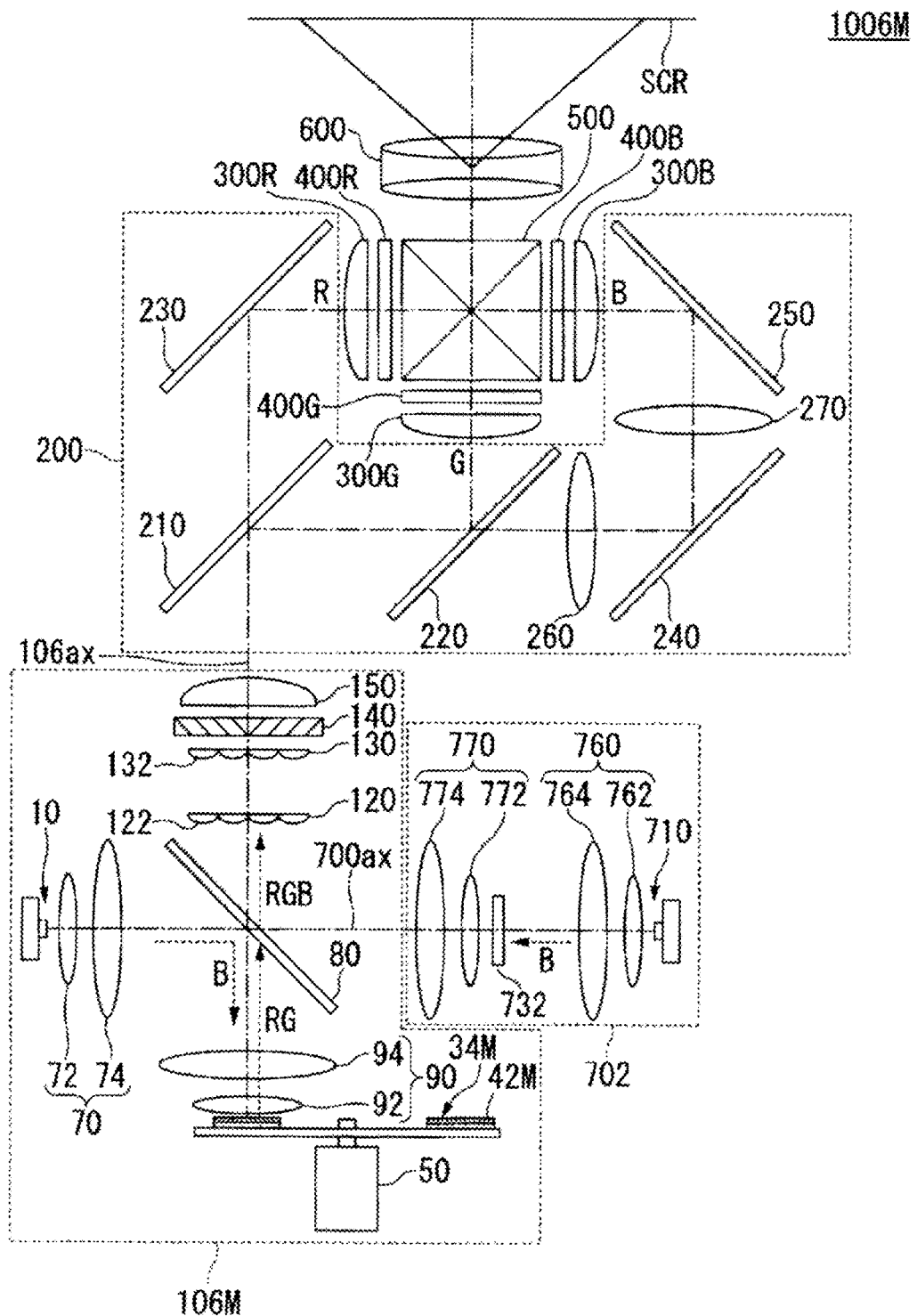
FIG. 18 is a schematic view illustrating a projector of a modification example of the second embodiment.

FIG. 18 is a schematic view illustrating a projector 1006M of a modification example. The projector 1006M is different from the projector 1006 shown in FIG. 11 in that it includes a light source device 106M in place of the light source device 106 of the first embodiment. The light source device 106M is different from the light source device 106 in that it includes a wavelength conversion element 34M in place of the above-mentioned wavelength conversion element 34. The other configuration is the same as that of the projector 1006, and therefore, the same elements as in FIG. 11 are denoted by the same reference numerals and signs, and a detailed description thereof will be omitted.

A collimating condenser optical system 90 has a function to make blue light from a dichroic mirror 80 incident on a phosphor layer 42M in a substantially condensed state and a function to make fluorescence emitted from the phosphor layer 42M substantially parallel.

In the light source device 106M, blue light from a light source 10 is incident on the phosphor layer 42M from the opposite side to the substrate 40.

Figure 19A:
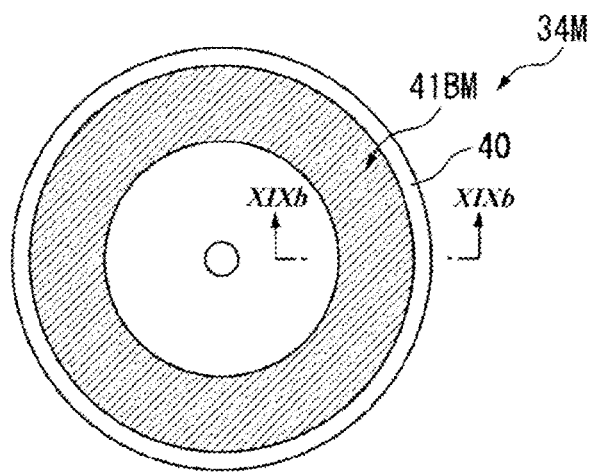
FIG. 19A is a schematic view showing a wavelength conversion element according to a modification example of the second embodiment.
Figure 19B:
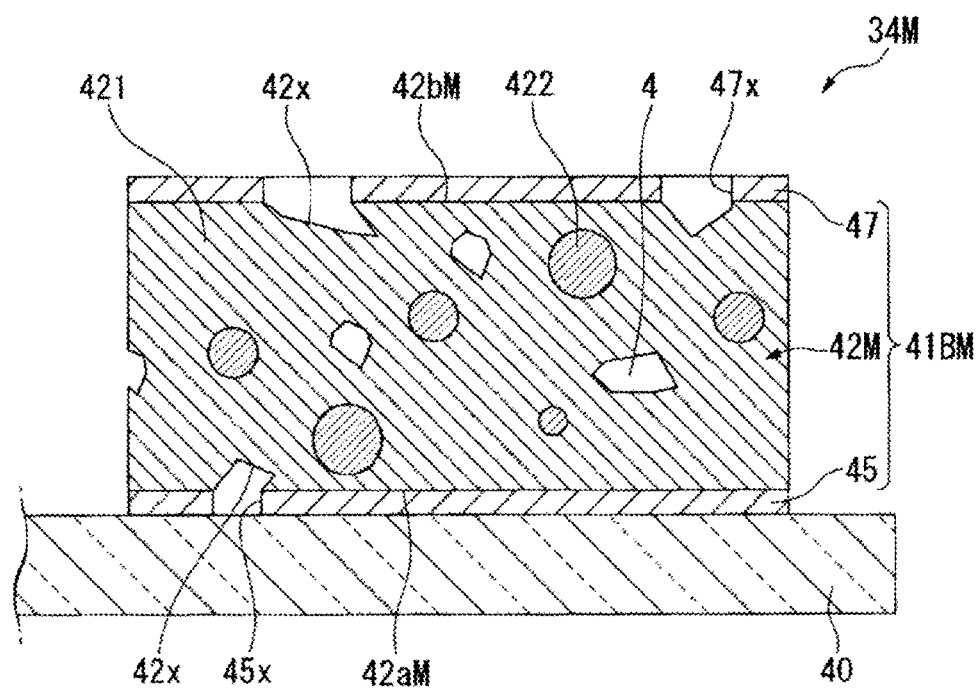
FIG. 19B is a cross-sectional view on arrow XIXb-XIXb of the wavelength conversion element shown in FIG. 19A.

FIG. 19A is a schematic view showing the wavelength conversion element 34M included in the projector 1006M, and FIG. 19B is a cross-sectional view on arrow taken along the line XIXb-XIXb in FIG. 19A.

As shown in FIGS. 19A and 19B, the wavelength conversion element 34M includes the substrate 40, the phosphor layer 42M provided in a ring shape on the substrate 40, a reflective film (optical functional layer) 45 provided between the substrate 40 and the phosphor layer 42M, and an antireflective film (optical functional layer) 47 provided on a second surface 42bM of the phosphor layer 42M. The phosphor layer 42M, the reflective film 45, and the antireflective film 47 constitute a wavelength conversion section 41BM. The wavelength conversion section 41BM emits fluorescence toward the side where blue light is incident.

Incidentally, as the substrate 40, a disk composed of a material which has high thermal conductivity and is not transparent such as a metal may be used.

The dichroic mirror 80 combines blue light from a second light source device 702 and yellow light from the wavelength conversion element 34M and generates white light.

Also in the wavelength conversion element 34M, in the same manner as the wavelength conversion element 30M, an optical functional layer having favorable properties is provided on the surface. Specifically, the amount (number) of defective parts 45x of the reflective film 45 is small, and therefore, the fluorescence YL generated in the phosphor layer 42M is reflected by the reflective film 45 with high efficiency, and can be emitted from the phosphor layer 42M in the opposite direction to the substrate 40. Further, the amount (number) of defective parts 47x of the antireflective film 47 is small, and therefore, the excitation light B and the fluorescence YL can be efficiently utilized in the same manner as the wavelength conversion element 30M. Further, since the thermal conductivity of the phosphor layer 42M is higher than the comparative example, and therefore, breakage due to thermal stress hardly occurs.

In the above-mentioned respective embodiments, a laser light source is used as the light source for excitation, however, a light-emitting diode may be used.

Further, in the above-mentioned respective embodiments, the phosphor layer is provided on the rotatable substrate, however, the invention is not limited thereto. The phosphor layer may be provided on a fixed substrate.

In the above-mentioned respective embodiments, a liquid crystal light modulator is used as the light modulator, but, the invention is not limited thereto. As the light modulator, a digital micromirror device may be used.

Hereinabove, preferred embodiments according to the invention have been described with reference to the accompanying drawings, however, the invention is not limited thereto. The shapes, combinations, and the like of the respective constituent members shown in the embodiments are merely examples, and can be variously changed based on the design requirements or the like within the scope not departing from the gist of the invention.

In the above-mentioned respective embodiments, an example in which the light source device according to the invention is mounted on the projector has been described, but, the invention is not limited thereto. The light source device according to the invention can be applied also to lighting apparatuses, headlights for cars, and the like.

The entire disclosure of Japanese Patent Application No.: 2015-236319, filed on Dec. 3, 2015, 2015-239956, filed on Dec. 9, 2015, 2015-239957, filed on Dec. 9, 2015, 2016-185193, filed on Sep. 23, 2016, and 2016-196203, filed on Oct. 4, 2016 are expressly incorporated by reference herein.

What is claimed is:

1. A phosphor comprising a sintered body of a ceramic material, wherein
the sintered body contains $Ce:Y_3Al_5O_{12}$ as a main phase and a ceramic material as a subphase, the ceramic material having a refractive index different from a refractive index of the main phase, and
the sintered body further includes a crystal grain boundary and a void at the crystal grain boundary.

2. The phosphor according to claim 1, wherein the subphase contains $Ce:YAlO_3$, $CeO_2$, $Y_2O_3$, or $Ce:Y_2O_3$ as a first crystal grain.

3. The phosphor according to claim 2, wherein the subphase further includes a second crystal grain different from the first crystal grain, and contains $Ce:YAlO_3$, $CeO_2$, $Y_2O_3$, or $Ce:Y_2O_3$ as the second crystal grain.

4. The phosphor according to claim 2, wherein
the subphase contains $Ce:YAlO_3$, $CeO_2$, or $Ce:Y_2O_3$, and
the atomic concentration [Y] (at %) of yttrium in the sintered body satisfies the following conditions (i) and (ii):

$$0.6 < [Y]/[A] \qquad \text{(i)}$$

$$0.6 < [Re]/[Al] \leq 0.652 \qquad \text{(ii)}$$

wherein [Re] represents the sum of the atomic concentration of yttrium and the atomic concentration of cerium, and [Al] represents the atomic concentration of aluminum.

5. The phosphor according to claim 1, wherein the main phase surrounds the periphery of the subphase.

6. The phosphor according to claim 1, wherein the void has a scale-like shape.

7. The phosphor according to claim 1, wherein a crystal grain constituting the main phase and a crystal grain constituting the subphase have a granular shape.

8. The phosphor according to claim 1, wherein the ratio of the volume of the main phase to the total volume of the main phase and the subphase is 90 vol % or more and less than 100 vol %.

9. A wavelength conversion element comprising a phosphor layer containing the phosphor according to claim 1 as a constituent material.

10. A light source device comprising:
the wavelength conversion element according to claim 9; and
a light source which irradiates the phosphor layer included in the wavelength conversion element with excitation light.

11. A projector comprising:
the light source device according to claim 10;
a light modulator which modulates light from the light source device in accordance with image information to form image light; and
a projection optical system which projects the image light.

12. A wavelength conversion element comprising a phosphor layer and an optical functional layer provided on the surface of the phosphor layer, wherein
the phosphor layer is composed of a sintered body containing a fluorescent ceramic material as a first crystallite and a ceramic material as a second crystallite, the ceramic material having a refractive index different from a refractive index of the first crystallite, the first crystallite contains $Ce:Y_3Al_5O_{12}$ and the second crystallite contains $Ce:YAlO_3$, $CeO_2$, $Y_2O_3$, $Ce:Y_2O_3$, or $YAlO_3$, and
the sintered body has a crystal grain boundary and a void at the crystal grain boundary.

13. The wavelength conversion element according to claim 12, wherein the optical functional layer is an antireflective film.

14. The wavelength conversion element according to claim 12, wherein the optical functional layer is a dichroic film.

15. The wavelength conversion element according to claim 12, wherein the optical functional layer is a reflective film.

16. The wavelength conversion element according to claim 12, wherein the phosphor layer further contains a ceramic material different from the second crystallite as a third crystallite, and a refractive index of the third crystallite is different from the refractive index of the first crystallite.

17. A light source device comprising:

the wavelength conversion element according to claim 12; and a light source which irradiates the phosphor layer included in the wavelength conversion element with excitation light.

18. A projector comprising:

the light source device according to claim 17;

a light modulator which modulates light from the light source device in accordance with image information to form image light; and a projection optical system which projects the image light.

19. A light source device comprising:

a light source which emits excitation light;

a wavelength conversion element including a phosphor layer that emits fluorescence in response to excitation by the excitation light; and a condenser optical system which is disposed on an optical path of the excitation light between the light source and the wavelength conversion element, and condenses the excitation light on the phosphor layer, wherein the phosphor layer is composed of a sintered body containing a fluorescent ceramic material as a first crystallite and a ceramic material as a second crystallite, the ceramic material having a refractive index different from a refractive index of the first crystallite, the first crystallite contains $Ce:Y_3Al_5O_{12}$ and the second crystallite contains $YAlO_3$.

20. A projector comprising:

the light source device according to claim 19;

a light modulator which modulates light from the light source device in accordance with image information to form image light; and a projection optical system which projects the image light.

* * * * *